(12) United States Patent
Saiki

(10) Patent No.: US 9,074,705 B2
(45) Date of Patent: Jul. 7, 2015

(54) EXHAUST PIPE AND METHOD FOR MANUFACTURING EXHAUST PIPE

(75) Inventor: Kenzo Saiki, Ibi-gun (JP)

(73) Assignee: IBIDEN CO., LTD., Ogaki-shi (JP)

( * ) Notice: Subject to any disclaimer, the term of this patent is extended or adjusted under 35 U.S.C. 154(b) by 672 days.

(21) Appl. No.: 13/431,929

(22) Filed: Mar. 27, 2012

(65) Prior Publication Data

US 2013/0074973 A1  Mar. 28, 2013

(30) Foreign Application Priority Data

Mar. 28, 2011  (JP) .................................. 2011-070412

(51) Int. Cl.
| F16L 9/14 | (2006.01) |
| F16L 9/00 | (2006.01) |
| F16L 58/14 | (2006.01) |
| F16L 55/00 | (2006.01) |

(52) U.S. Cl.
CPC . F16L 9/00 (2013.01); F16L 58/14 (2013.01); F16L 2201/60 (2013.01); F16L 55/00 (2013.01)

(58) Field of Classification Search
CPC ......... C23C 24/00; C23C 30/00; F01N 13/08; F16L 2201/60; F16L 11/124
USPC .................. 138/145, 146; 428/34.1; 116/205; 427/261
See application file for complete search history.

(56) References Cited

U.S. PATENT DOCUMENTS

| 4,520,053 A * | 5/1985 | Marentic .......................... 428/31 |
| 4,603,653 A * | 8/1986 | Bews ............................ 116/209 |
| 5,369,419 A * | 11/1994 | Stephenson et al. ............. 347/61 |
| 5,623,890 A * | 4/1997 | Lenske .......................... 116/205 |
| 6,576,862 B1 * | 6/2003 | Costin et al. ................ 219/121.6 |
| 2002/0023674 A1 | 2/2002 | Sugawara et al. |
| 2002/0033514 A1 | 3/2002 | Sugawara et al. |
| 2004/0185206 A1 * | 9/2004 | Kappeler ..................... 428/36.91 |
| 2007/0163250 A1 | 7/2007 | Sane et al. |
| 2008/0107844 A1 * | 5/2008 | Ito ................................ 428/34.1 |
| 2009/0120350 A1 * | 5/2009 | Tamez, Jr. ..................... 116/205 |
| 2011/0000575 A1 | 1/2011 | Ito et al. |
| 2012/0006419 A1 * | 1/2012 | Richardson ................ 137/15.01 |
| 2013/0074973 A1 | 3/2013 | Saiki |
| 2014/0227488 A1 * | 8/2014 | Brehm et al. ................. 428/162 |

FOREIGN PATENT DOCUMENTS

| DE | 20022075 U1 | 6/2001 |
| DE | 10254715 | 6/2004 |
| EP | 1617125 | 1/2006 |
| EP | 2210919 | 7/2010 |

(Continued)

OTHER PUBLICATIONS

Database WPI Week 198632 Thomson Scientific, London, GB; AN 1986-207874 XP002673455.

(Continued)

Primary Examiner — Patrick F Brinson
(74) Attorney, Agent, or Firm — Mori & Ward, LLP

(57) ABSTRACT

An exhaust pipe includes a base material, a surface coating layer, and an information display. The base material is made of a metal. The surface coating layer is provided on a surface of the base material. The surface coating layer includes an amorphous inorganic material. The information display includes a character portion and a background portion. At least one of the character portion and the background portion is located in the surface coating layer.

25 Claims, 7 Drawing Sheets

(56) References Cited

FOREIGN PATENT DOCUMENTS

| | | |
|---|---|---|
| JP | 61-139433 | 6/1986 |
| JP | 62-107076 | 5/1987 |
| JP | 62-107086 | 5/1987 |
| JP | 63-154815 | 5/1988 |
| JP | 64-37477 | 2/1989 |
| JP | 02-256983 | 10/1990 |
| JP | 07-090619 | 4/1995 |
| JP | 3812035 B2 | 8/1998 |
| JP | 2003-081679 | 3/2003 |
| JP | 2003-280567 | 10/2003 |
| JP | 2008-069383 | 3/2008 |
| JP | 2009-115414 | 5/2009 |
| JP | 2009-133213 | 6/2009 |
| JP | 2009-133214 | 6/2009 |
| WO | WO 2005/005680 | 1/2005 |
| WO | WO 2010/111773 | 10/2010 |

OTHER PUBLICATIONS

Office Action with Form PTO-892 Notice of References Cited issued by the U.S. Patent and Trademark Office for the U.S. Appl. No. 13/368,336, Apr. 2, 2014.

* cited by examiner

A-A line cross-sectional view

B-B line cross-sectional view

EXHAUST PIPE AND METHOD FOR MANUFACTURING EXHAUST PIPE

CROSS-REFERENCE TO RELATED APPLICATIONS

The present application claims priority under 35 U.S.C. §119 to Japanese Patent Application No. 2011-070412, filed on Mar. 28, 2011, the contents of which are incorporated herein by reference in their entirety.

BACKGROUND OF THE INVENTION

1. Field of the Invention

The present invention relates to an exhaust pipe and a method for manufacturing an exhaust pipe.

2. Discussion of the Background

In order to purify injurious substances such as injurious gases contained in exhaust gases discharged from an engine, a catalyst converter is installed in an exhaust gas passage including an exhaust pipe.

In order to improve the conversion efficiency of injurious substances by the catalyst converter, it is necessary to maintain the temperature of exhaust gases and the temperature of the exhaust pipe and the like through which the exhaust gases is allowed to pass at temperatures suitable for activating the catalyst (hereinafter, referred to also as a catalyst activation temperature).

In a previous exhaust gas purifying system, the temperature of the catalyst converter at starting of an engine is lower than the catalyst activation temperature.

Accordingly, it is required that, in an exhaust pipe connected to the engine, the temperature can be raised to the catalyst activation temperature in a short time from starting of the engine.

For example, JP-A 2009-133214 discloses an exhaust pipe including a cylindrical base material made of a metal, and a surface coating layer made of a crystalline inorganic material and an amorphous binder (amorphous inorganic material). The surface coating layer is formed on a circumferential surface of the base material.

It is described that, in the previous exhaust pipe described in JP-A 2009-133214, when the thermal conductivity of the surface coating layer is lower than the thermal conductivity of the base material, the exhaust pipe is excellent in the thermal insulation property. It is described that, as a result, in the previous exhaust pipe described in JP-A 2009-133214, the temperature can be raised to the catalyst activation temperature in a short time from starting of the engine.

The contents of JP-A 2009-133214 are incorporated herein by reference in their entirety.

SUMMARY OF THE INVENTION

According to one aspect of the present invention, an exhaust pipe includes a base material, a surface coating layer, and an information display. The base material is made of a metal. The surface coating layer is provided on a surface of the base material. The surface coating layer includes an amorphous inorganic material. The information display includes a character portion and a background portion. At least one of the character portion and the background portion is located in the surface coating layer.

According to another aspect of the present invention, a method for manufacturing an exhaust pipe includes preparing a base material made of a metal. A paint including an amorphous inorganic material is provided on a surface of the base material to form a coating film which includes the amorphous inorganic material. The coating film is heated to a temperature not lower than a softening point of the amorphous inorganic material to form a surface coating layer which includes the amorphous inorganic material on the surface of the base material. An information display including a character portion and a background portion is formed so that at least one of the character portion and the background portion is located in the surface coating layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
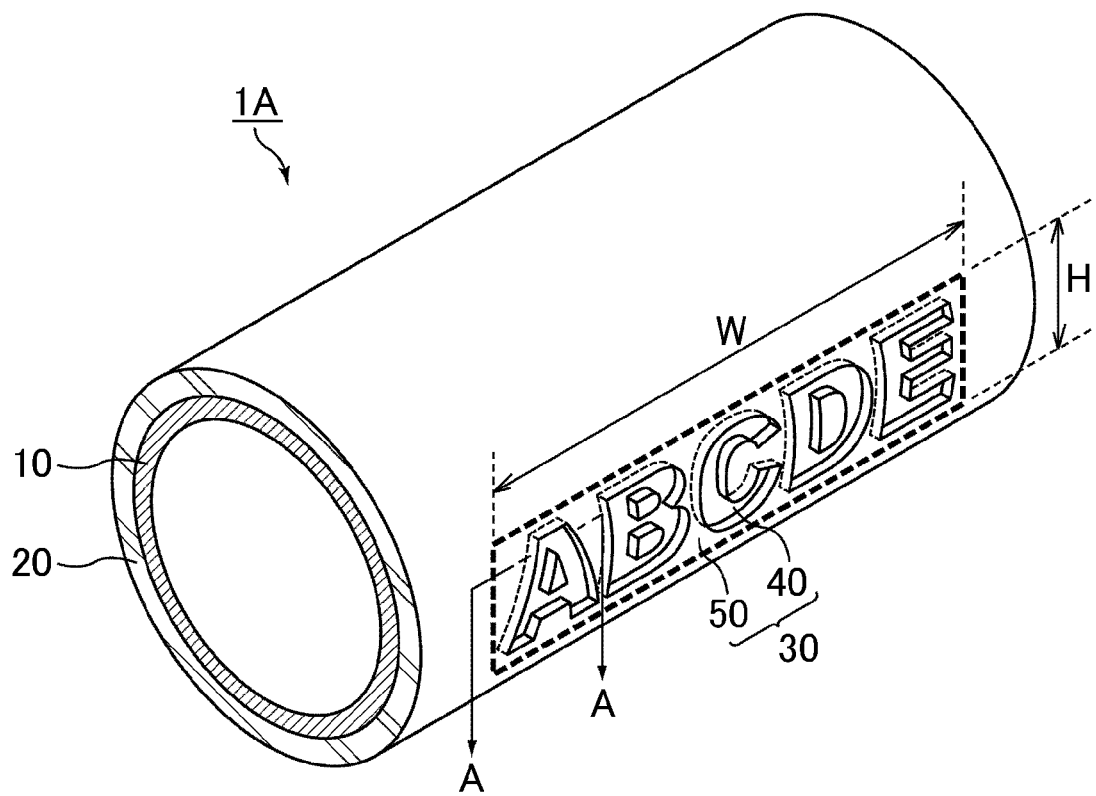
FIG. 1 is a perspective view schematically showing one example of the exhaust pipe in accordance with a first embodiment of the present invention.

An exhaust pipe according to an embodiment of the present invention includes a base material made of a metal, a surface coating layer containing an amorphous inorganic material on a surface of the base material, and an information display including a character portion and a background portion, wherein at least one of the character portion and the background portion is located in the surface coating layer.

In the above-mentioned constitution, the information display including the character portion and the background portion, and at least one of the character portion and the background portion is located in the surface coating layer. Since the surface coating layer contains an amorphous inorganic material, it tends not to vanish by heat applied at operation of an engine. In addition, since the metal base material is not impressed, the exhaust pipe is not likely to be damaged by vibration applied at operation of an engine.

In the exhaust pipe according to an embodiment of the present invention, the thickness of the surface coating layer in the character portion is different from the thickness of the surface coating layer in the background portion.

In the exhaust pipe according to an embodiment of the present invention, the thickness of the surface coating layer in the character portion is greater than the thickness of the surface coating layer in the background portion.

In the exhaust pipe according to an embodiment of the present invention, one of the character portion and the background portion is an exposed area of the base material.

In the exhaust pipe according to an embodiment of the present invention, the character portion is the exposed area of the base material.

These constitutions result in that there is a difference in level between the character portion and the background portion.

When there is a difference in level between the character portion and the background portion, a worker tends to feel a difference from other portions only by touch with a hand. Accordingly, this difference in level may become easier to be provided so as to correspond to an attachment position (attachment direction) of the exhaust pipe. As a result, information such as character information as identification information may become easier to be imparted. Further, workability at attachment of the exhaust pipe tends to be improved.

In addition, since a site greater in the thickness of the surface coating layer as compared with other sites easily generates a crack due to thermal shock as compared with the other sites, the site can also serve as a sensor for thermal shock. When there is such a site, endurance to thermal shock tends to be confirmed by checking only the site. As a result, conveniently, it is not necessary to check the whole exhaust pipe.

The sensor for thermal shock refers to a site by which it is possible to test whether a crack has been generated on the surface coating layer due to thermal shock given to the exhaust pipe.

In the exhaust pipe according to an embodiment of the present invention, the chemical composition of the surface coating layer in the character portion is different from the chemical composition of the surface coating layer in the background portion, and in one of the character portion and the background portion, the surface coating layer has a composition including an amorphous inorganic material and a crystalline inorganic material, and in the other of the character portion and the background portion, the surface coating layer has a composition consisting of an amorphous inorganic material, or the amorphous inorganic material, the crystalline inorganic material, both of the amorphous inorganic material and the crystalline inorganic material, or an amount of the crystalline inorganic material relative to an amount of the amorphous inorganic material in the surface coating layer is different between the character portion and the background portion.

In the exhaust pipe according to an embodiment of the present invention, in at least one of the character portion and the background portion, the surface coating layer includes a plurality of layers having different chemical compositions laminated in a thickness direction, and in the plurality of layers having different chemical compositions, one layer includes an amorphous inorganic material and a crystalline inorganic material, and another layer consists of an amorphous inorganic material, or the amorphous inorganic material, the crystalline inorganic material, both of the amorphous inorganic material and the crystalline inorganic material, or an amount of the crystalline inorganic material relative to an amount of the amorphous inorganic material in one layer is different from that of another layer.

In the exhaust pipe according to an embodiment of the present invention, a site having a great surface roughness and a site having a small surface roughness are provided on the surface of the base material, the character portion is the surface coating layer formed on either of the site having a great surface roughness or the site having a small surface roughness, and the background portion is the surface coating layer formed on the site having the surface roughness different from the surface roughness of the site on which the character portion is formed.

According to these constitutions, since the appearance of the surface coating layer in the character portion is different from the appearance of the surface coating layer in the background portion, information tends to be displayed.

In the exhaust pipe according to an embodiment of the present invention, the information display shows information about at least one selected from a product name, a product number, a manufacturing number, a product kind, a weight, a product size, an applicable type of vehicle, attention-seeking, contact information and a company name.

In the exhaust pipe according to an embodiment of the present invention, the character portion is provided with a character showing the information, and the character is at least one selected from an alphabet, a digit, a Chinese character, a hiragana character, a katakana character, a symbol and a dot.

Since the information is identifiable and advantageous to a worker who handles the exhaust pipe, the information is preferable as an information display provided on the exhaust pipe.

In the exhaust pipe according to an embodiment of the present invention, the amorphous inorganic material is a low melting point glass having a softening point of from about 300° C. to about 1000° C., and is at least one kind selected from the group consisting of a $SiO_2$—$B_2O_3$—$ZnO$ type glass, a $SiO_2$—$B_2O_3$—$Bi_2O_3$ type glass, a $SiO_2$—$PbO$ type glass, a $SiO_2$—$PbO$—$B_2O_3$ type glass, a $SiO_2$—$B_2O_3$—$PbO$ type glass, a $B_2O_3$—$ZnO$—$PbO$ type glass, a $B_2O_3$—$ZnO$—$Bi_2O_3$ type glass, a $B_2O_3$—$Bi_2O_3$ type glass, a $B_2O_3$—$ZnO$ type glass, a $BaO$—$SiO_2$ type glass and a $SiO_2$—$BaO$—$B_2O_3$ type glass.

If the softening point of the low melting point glass is not lower than about 300° C., the glass tends not to be easily softened even when heat is applied during use as the exhaust pipe. For that reason, when a foreign substance such as a stone or sand comes from the outside and contacts with the surface coating layer of the exhaust pipe, the foreign substance tends not to adhere to the glass. As a result, it may become easier to prevent decrease in identifiability caused by a change of the appearance of the surface coating layer when the foreign substance adheres to a surface of the glass of the surface coating layer.

When the softening point of the low melting point glass is not higher than about 1000° C., it may become easier to prevent deterioration of the base material of the exhaust pipe caused by heat treatment upon forming of the surface coating layer of the exhaust pipe.

In the exhaust pipe according to an embodiment of the present invention, the surface coating layer further contains a crystalline inorganic material.

In the exhaust pipe according to an embodiment of the present invention, the crystalline inorganic material contains inorganic particles made of at least one of oxides of manganese, iron, copper, cobalt, chromium, and aluminum.

The thermal expansion coefficient of the crystalline inorganic material is low, and the thermal expansion coefficient of the amorphous inorganic material is high. For that reason, by adjusting the blending ratio between the crystalline inorganic material and the amorphous inorganic material, the thermal expansion coefficient of the surface coating layer tends to be controlled. Therefore, by bringing the thermal expansion coefficients of the surface coating layer and the base material made of a metal close to each other, an adhering force between the surface coating layer and the base material made of a metal tends to be improved.

A method for manufacturing an exhaust pipe according to an embodiment of the present invention includes: forming a surface coating layer containing an amorphous inorganic material on a surface of a base material made of a metal, and forming an information display including a character portion and a background portion, wherein at least one of the character portion and the background portion is located in the surface coating layer, and the surface coating layer is formed by forming a coating film by applying a paint containing an amorphous inorganic material, and heating the coating film to a temperature not lower than a softening point of the amorphous inorganic material to form the surface coating layer.

By the above-mentioned steps, the surface coating layer is formed, and by forming an information display in which at least one of the character portion and the background portion is located in the surface coating layer, an exhaust pipe including an information display may become easier to be manufactured.

The thus formed information display tends not to vanish by heat applied at operation of an engine. In addition, the exhaust pipe tends not to be damaged by vibration applied at operation of an engine.

In the method for manufacturing an exhaust pipe according to an embodiment of the present invention, the forming of the information display includes at least one of suppressing of the forming of the coating film onto the base material, promoting of the forming of the coating film onto the base material, and removing of part of the coating film or part of the surface coating layer formed on the base material.

In the method for manufacturing an exhaust pipe according to an embodiment of the present invention, the suppressing of the forming of the coating film onto the base material includes: at least one of masking the base material, and forming a material for repelling a paint on the base material.

In the method for manufacturing an exhaust pipe according to an embodiment of the present invention, the promoting of the forming of the coating film onto the base material includes: at least one of rolling transfer using a transfer roller having an irregularity on a surface, impression transfer using a flat plate having an irregularity shape on a surface, and liquid spraying from a liquid spraying head.

In the method for manufacturing an exhaust pipe according to an embodiment of the present invention, the removing of part of the coating film or part of the surface coating layer formed on the base material includes: at least one of shotblast, sandblast, polishing, elution, and cutting.

By these methods, the thickness of the surface coating layer in the character portion tends to be different from the thickness of the surface coating layer in the background portion.

In addition, when the removing of part of the coating film or part of the surface coating layer formed on the base material is included, one of the character portion and the background portion may become easier to be served as a surface of the base material.

In addition, identification information may become easier to be displayed by a difference in the thickness of the surface coating layer.

In the method for manufacturing an exhaust pipe according to an embodiment of the present invention, the forming of the coating film includes at least one of atomized spray painting, liquid electrostatic coating, powder electrostatic coating, electrocoating, and dipping.

According to the above-mentioned method, the forming of the coating film by using a paint containing an amorphous inorganic material tends to be suitably performed.

As a result, the surface coating layer containing the amorphous inorganic material may become easier to be formed to display identification information.

In the method for manufacturing an exhaust pipe according to an embodiment of the present invention, the temperature not lower than the softening point in the heating of the amorphous inorganic material is from about 300° C. to about 1000° C.

When the temperature not lower than the softening point in the heating of the amorphous inorganic material is not lower than about 300° C., the amorphous inorganic material tends not to be softened during use as the exhaust pipe, and a foreign substance tends not to adhere to the surface coating layer of the exhaust pipe.

When the temperature not lower than the softening point in the heating of the amorphous inorganic material is not higher than about 1000° C., it may become easier to prevent deterioration of the base material of the exhaust pipe caused by heat treatment upon forming the surface coating layer.

In the method for manufacturing an exhaust pipe according to an embodiment of the present invention, the forming of the coating film includes forming the surface coating layer such that the chemical composition of the surface coating layer in the character portion is different from the chemical composition of the surface coating layer in the background portion, using a plurality of kinds of paints having different chemical compositions, and the plurality of kinds of paints have different chemical compositions such that one paint includes an amorphous inorganic material and a crystalline inorganic material, and the other paint consists of an amorphous inorganic material, or the plurality of kinds of paints have different chemical compositions such that the amorphous inorganic material is different, the crystalline inorganic material is different, both of the amorphous inorganic material and the crystalline inorganic material are different, or an amount of the crystalline inorganic material relative to an amount of the amorphous inorganic material is different.

In the case of this method, the chemical composition of the surface coating layer in the character portion may become easier to be different from the chemical composition of the surface coating layer in the background portion. For that reason, identification information may become easier to be displayed by a difference in the appearance of the surface coating layer in the character portion and the background portion.

In the method for manufacturing an exhaust pipe according to an embodiment of the present invention, the forming of the coating film includes: forming a first coating film, and forming a second coating film on the first coating film after the forming of the first coating film.

In the method for manufacturing an exhaust pipe according to an embodiment of the present invention, further including: heating the first coating film to a temperature not lower than the softening point of the amorphous inorganic material, between the forming of the first coating and the forming of the second coating film.

In the method for manufacturing an exhaust pipe according to an embodiment of the present invention, the forming of the information display further includes: providing a site having a great surface roughness and a site having a small surface roughness on the surface of the base material.

In the method for manufacturing an exhaust pipe according to an embodiment of the present invention, the providing of the site having the great surface roughness and the site having the small surface roughness on the surface of the base material includes: at least one of shotblast, sandblast, polishing, elution and cutting.

In these methods, the appearance of the surface coating layer in the character portion may become easier to be different from the appearance of the surface coating layer in the background portion. For that reason, information may become easier to be displayed by the difference in the appearance of the surface coating layer between the character portion and the background portion.

In the method for manufacturing an exhaust pipe according to an embodiment of the present invention, the amorphous inorganic material is a low melting point glass having a softening point of from about 300° C. to about 1000° C.

In the method for manufacturing an exhaust pipe according to an embodiment of the present invention, the paint further contains a crystalline inorganic material.

In the method for manufacturing an exhaust pipe according to an embodiment of the present invention, the crystalline inorganic material contains inorganic particles made of at least one of oxides of manganese, iron, copper, cobalt, chromium and aluminum.

The embodiments will now be described with reference to the accompanying drawings, wherein like reference numerals designate corresponding or identical elements throughout the various drawings. However, the present invention is not limited to the following embodiments, and can be appropriately modified for application as long as the gist of the present invention is not changed.

In order to impart a variety of identification information to an exhaust pipe, there is a method of directly describing a character on a surface coating layer with an oily paint to form a display.

There is also a method of impressing a surface of a base material made of a metal to impart identification information to the exhaust pipe.

However, when a character is directly described on the surface coating layer using an oily paint, information is vanished by burning or volatilization of the paint due to heat applied at operation of an engine.

In addition, when a surface of a metal base material is impressed, a crack is extended to the whole metal base material beginning from an impressed portion by vibration applied at operation of an engine, and damage of the exhaust pipe is generated.

The exhaust pipe in accordance with an embodiment of the present invention has a base material made of a metal, a surface coating layer containing an amorphous inorganic material on a surface of the base material, and an information display including a character portion and a background portion, wherein at least one of the character portion and the background portion is located in the surface coating layer.

In addition, a method for manufacturing the exhaust pipe in accordance with an embodiment of the present invention includes: forming a surface coating layer containing an amorphous inorganic material on a surface of a base material made of a metal, and forming an information display including a character portion and a background portion, wherein at least one of the character portion and the background portion is located in the surface coating layer, and the surface coating layer is formed by forming a coating film by applying a paint containing an amorphous inorganic material, and heating the coating film to a temperature not lower than a softening point of the amorphous inorganic material to form the surface coating layer.

The exhaust pipe in accordance with an embodiment of the present invention and a method for manufacturing an exhaust pipe in accordance with an embodiment of the present invention may become easier to provide an exhaust pipe including an information display, which does not generate disadvantages such as vanishment by heat applied at operation of an engine and induction of damage of an exhaust pipe by vibration applied at operation of an engine, and a method for manufacturing an exhaust pipe.

(First Embodiment)

A first embodiment which is one embodiment of an exhaust pipe of the present invention, and a method for manufacturing the exhaust pipe will be explained below. First, the exhaust pipe in accordance with the first aspect of the embodiment of the present invention will be explained.

Figure 2:
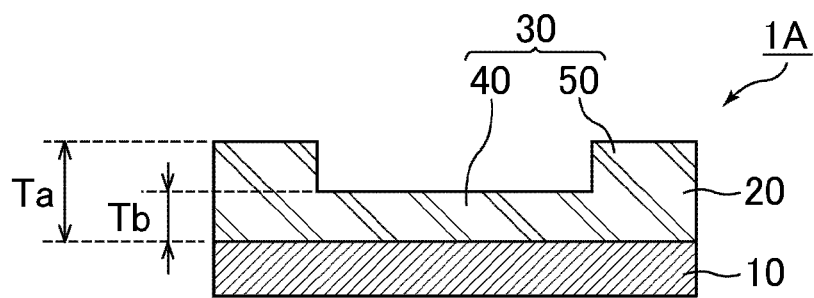
FIG. 2 is an A-A line cross-sectional view of part of the exhaust pipe shown in FIG. 1.

FIG. 1 is a perspective view schematically showing one example of the exhaust pipe in accordance with the first aspect of the embodiment of the present invention, and FIG. 2 is an A-A line cross-sectional view of part of the exhaust pipe shown in FIG. 1.

An exhaust pipe 1A shown in FIG. 1 includes a base material 10 made of a metal, and a surface coating layer 20 formed on a surface of the base material 10.

The surface coating layer 20 is a layer containing an amorphous inorganic material, and details of the composition thereof will be described later.

The exhaust pipe 1A further has an information display 30. The information display 30 includes a character portion 40 which is character information, and a background portion 50 which is the background of the character information.

In the exhaust pipe 1A, both of the character portion 40 and the background portion 50 are located in the surface coating layer 20, and the thickness of the surface coating layer in the character portion 40 is different from the thickness of the surface coating layer in the background portion 50.

As shown in FIG. 2, in the exhaust pipe 1A, the thickness Tb of the surface coating layer 20 at the character portion 40 is smaller than the thickness Ta of the surface coating layer at the background portion 50.

Figure 3:
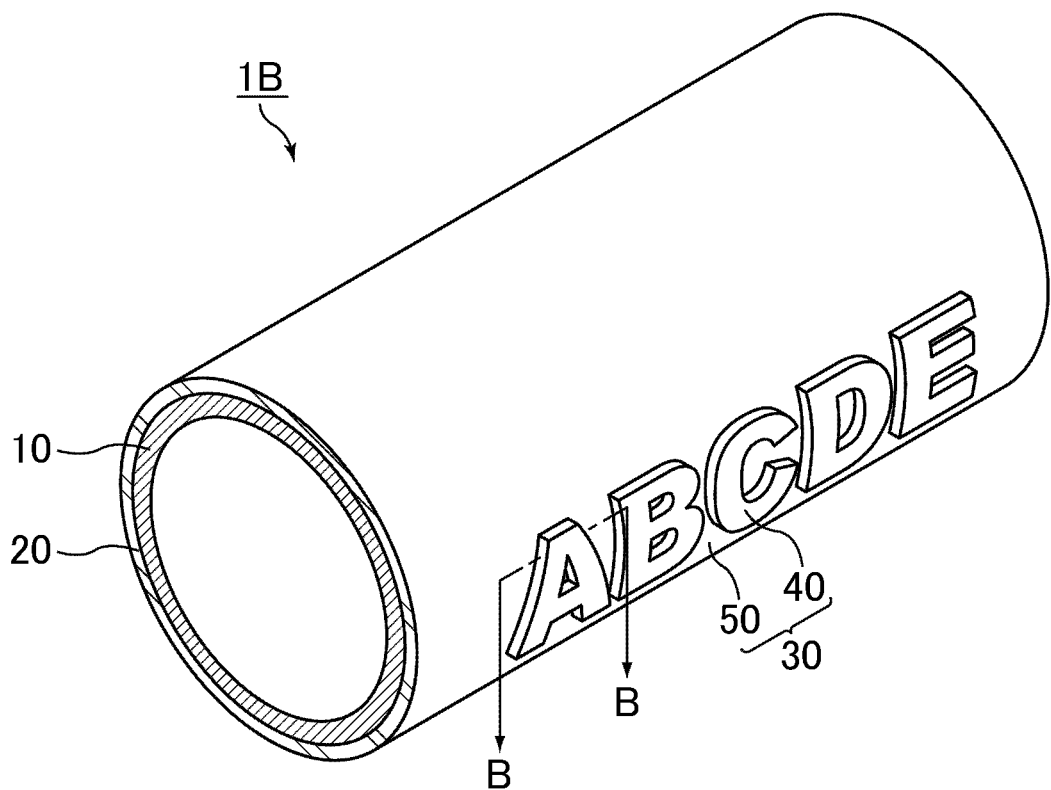
FIG. 3 is a perspective view schematically showing another example of the exhaust pipe in accordance with the first embodiment of the present invention.
Figure 4:
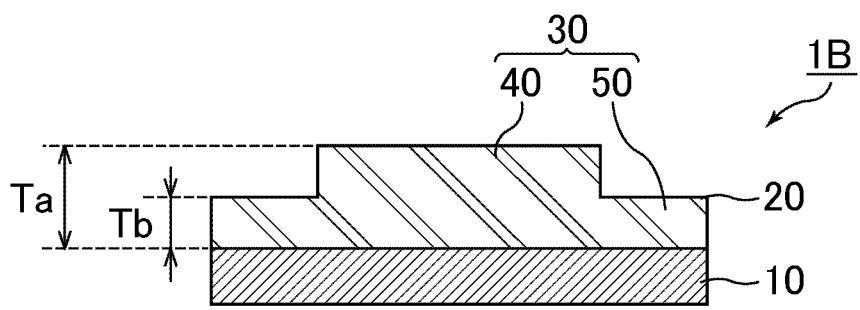
FIG. 4 is a B-B line cross-sectional view of part of the exhaust pipe shown in FIG. 3.

FIG. 3 is a perspective view schematically showing another example of the exhaust pipe in accordance with the first aspect of the embodiment of the present invention, and FIG. 4 is a B-B line cross-sectional view of part of the exhaust pipe shown in FIG. 3.

An exhaust pipe 1B shown in FIG. 3 includes a base material 10 made of a metal, and a surface coating layer 20 formed on a surface of the base material 10.

The exhaust pipe 1B has an information display 30 including a character portion 40 which is character information, and a background portion 50 which is the background of the character information.

As shown in FIG. 4, in the exhaust pipe 1B, the thickness Ta of the surface coating layer 20 at the character portion 40 is greater than the thickness Tb of the surface coating layer at the background portion 50.

As in the exhaust pipe 1A and the exhaust pipe 1B, the thickness of the surface coating layer in the character portion is different from the thickness of the surface coating layer in the background portion. For that reason, since the character portion and the background portion are visually recognized discriminably by a worker, information may become easier to be displayed by the character portion and the background portion.

Examples of a material of the base material include metals such as stainless steel, steel, iron, and copper, nickel alloys such as Inconel, Bastelloy, and Invar, and the like. These metal materials of the base material tends to improve an adhering force between the surface coating layer and the base material made of a metal, by bringing the thermal expansion coefficient of the metal material close to that of the material constituting the surface coating layer, as described later.

The shape of the base material is not particularly limited, but when the base material is used as the exhaust pipe, a tubular shape is preferable, and a cylindrical shape is more desirable.

It is preferable that the amorphous inorganic material contained in the surface coating layer is a low melting point glass having a softening point of from about 300° C. to about 1000° C. In addition, the kind of the low melting point glass is not particularly limited, and examples thereof include a soda-lime glass, an alkali-free glass, a borosilicate glass, a potash glass, a crystal glass, a titanium crystal glass, a barium glass, a boron glass, a strontium glass, an aluminosilicate glass, a soda-zinc glass, a soda-barium glass and the like.

These glasses may be used alone, or two or more kinds thereof may be mixed.

When the low melting point glass has a softening point in a range of from about 300° C. to about 1000° C., a strong surface coating layer may become easier to be formed on a surface of the base material made of a metal, by melting the low melting point glass, and applying (coating) the melt to a surface of the base material (metal material) and, thereafter, performing heating and firing treatment.

When the softening point of the low melting point glass is not lower than about 300° C., the glass tends not to be easily softened when heat is applied during use as the exhaust pipe. For that reason, when a foreign substance such as a stone or sand comes from the outside and contacts with the surface coating layer of the exhaust pipe, the foreign substance tends not to adhere to the glass not softened. Also, it may become easier to prevent decrease in identifiability caused by a change of the appearance of the surface coating layer when the foreign substance adheres to a surface of the glass of the surface coating layer.

On the other hand, when the softening point of the low melting point glass is not higher than about 1000° C., the base material of the exhaust pipe is less likely to be deteriorated by heat treatment upon formation of the surface coating layer of the exhaust pipe. In addition, the softening point of the low melting point glass can be measured, for example, using a glass automatic softening point and strain point measuring apparatus (SSPM-31) manufactured by OPT CORP. in accordance with the method defined in JIS R 3103-1:2001.

The contents of JIS R 3103-1:2001 are incorporated herein by reference in their entirety.

The kind of the borosilicate glass is not particularly limited, and examples thereof include a $SiO_2$—$B_2O_3$—$ZnO$ type glass, a $SiO_2$—$B_2O_3$—$Bi_2O_3$ type glass and the like. The crystal glass is a glass containing PbO and the kind of the glass is not particularly limited, and examples thereof include a $SiO_2$—$PbO$ type glass, a $SiO_2$—$PbO$—$B_2O_3$ type glass, a $SiO_2$—$B_2O_3$—$PbO$ type glass and the like. The kind of the boron glass is not particularly limited, and examples thereof include a $B_2O_3$—$ZnO$—$PbO$ type glass, a $B_2O_3$—$ZnO$—$Bi_2O_3$ type glass, a $B_2O_3$—$Bi_2O_3$ type glass, a $B_2O_3$—$ZnO$ type glass and the like. The kind of the barium glass is not particularly limited, and examples thereof include a $BaO$—$SiO_2$ type glass, a $SiO_2$—$BaO$—$B_2O_3$ type glass and the like.

In addition, the amorphous inorganic material may include only of one kind of low melting point glass among the above-mentioned low melting point glasses, or may include a plurality of kinds of low melting point glasses.

The surface coating layer may further contain a crystalline inorganic material in addition to the amorphous inorganic material.

It is desirable that an oxide of a transition metal is used as the crystalline inorganic material contained in the surface coating layer.

In addition, it is desirable that the crystalline inorganic material contained in the surface coating layer is inorganic particles of made of at least one oxides of aluminum, manganese, iron, copper, cobalt, chromium and aluminum.

Inorganic particles of these oxides may be used alone, or two or more kinds thereof may be mixed.

Examples of the information display include at least one selected from a product name, a product number, a manufacturing number, a product kind, a weight, a product size, an applicable type of vehicle, attention-seeking, contact information and a company name, provided that the information display is not limited to these examples.

In addition, examples of a character displayed by the character portion include at least one selected from an alphabet, a digit, a Chinese character, a hiragana character, a katakana character, a symbol and a dot.

However, the character is not limited to these examples, and may be appropriately changed in accordance with the character and the like used in a country or area where the exhaust pipe according to embodiments of the present invention is manufactured or sold.

By making such an information display on the exhaust pipe, a worker handling the exhaust pipe and the like easily discriminates information.

In the exhaust pipe in accordance with the present embodiment, it is desirable that a relationship between thicknesses of the surface coating layer at the character portion and the background portion of Ta−Tb=from about 7 μm to about 20 μm holds, defining the greater thickness as Ta, and defining the smaller thickness as Tb, of the thickness of the surface coating layer at the character portion and the thickness of the surface coating layer at the background portion.

When (Ta−Tb) is about 7 μm or more, a difference in the thickness of the surface coating layer is great, and a difference in level due to a difference in thickness between the character portion and the background portion may become easier to be felt by a worker by touching the surface coating layer with a hand. For that reason, an information display can be provided so as to correspond to an attachment position (attachment direction) of the exhaust pipe. As a result, information such as character information as identification information tends to be imparted and, further, workability at attachment of the exhaust pipe tends to be improved.

When (Ta−Tb) is not more than about 20 μm, there is no portion in which the thickness of the surface coating layer is greater than about 20 μm, and therefore a crack or peeling of the surface coating layer due to thermal shock is not likely to be generated in this portion.

In addition, it is desirable that the thickness of the surface coating layer is such that the greater thickness Ta is from about 8 μm to about 30 μm, and it is desirable that the smaller thickness Tb is from about 1 μm to about 10 μm.

By determining Ta and Tb in such ranges, (Ta−Tb) tends to be determined in a range of from about 7 μm to about 20 μm, which is an optimal range.

The thickness of the surface coating layer can be measured according to ISO 2178 (Non-magnetic coatings on magnetic substrates—Measurement of coating thickness—Magnetic method), or ISO 2360 (Non-conductive coatings on non-magnetic electrically conductive basis materials—Measurement of coating thickness—Amplitude-sensitive eddy-current method), in view of the material of the base material and the material of the surface coating layer.

The contents of ISO 2178 and ISO 2360 are incorporated herein by reference in their entirety.

Then, a method for manufacturing the exhaust pipe in accordance with the first aspect of the embodiment of the present invention will be explained.

The method for manufacturing the exhaust pipe in accordance with the first aspect of the embodiment of the present invention includes:

forming a surface coating layer containing an amorphous inorganic material on a surface of a base material made of a metal, and forming an information display including a character portion and a background portion, wherein at least one of the character portion and the background portion is located in the surface coating layer, and the surface coating layer is formed by forming a coating film by applying a paint containing an amorphous inorganic material, and heating the coating film to a temperature not lower than the softening point of the amorphous inorganic material to form the surface coating layer.

The method for manufacturing the exhaust pipe in accordance with the first aspect of the embodiment of the present invention includes some aspects and, firstly, a first aspect of the method for manufacturing the exhaust pipe in accordance with the first embodiment of the embodiment of the present invention will be explained taking for example the case where the exhaust pipe 1A shown in FIG. 1 and FIG. 2 is made.

FIG. 5A, FIG. 5B, FIG. 5C, FIG. 5D, FIG. 5E and FIG. 5F are a process drawing schematically showing a first aspect of the method for manufacturing an exhaust pipe in accordance with the first embodiment of the present invention.

(1) Preparing a Base Material Made of a Metal

Using a base material made of a metal (hereinafter, also referred to as a metal base material or a metal material) as a starting material, firstly, cleaning treatment is performed in order to remove impurities on a surface of the metal base material.

The cleaning treatment is not particularly limited, and a previously known cleaning treatment can be used. Specific examples thereof include a method of performing ultrasonic cleaning in an alcohol solvent, and the like.

After the cleaning treatment, as necessary, a surface of the metal base material may be subjected to roughening treatment in order to increase the specific surface area of a surface of the metal base material or adjust the surface roughness of the metal base material. Specific examples thereof include roughening treatment such as sandblast treatment, etching treatment, and high temperature oxidation treatment. These may be used alone, or two or more kinds may be used together.

After this roughening treatment, cleaning treatment may be further performed.

Figure 5A:
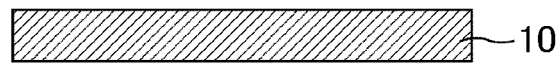
FIG. 5A, FIG. 5B, FIG. 5C, FIG. 5D, FIG. 5E, and FIG. 5F are a process drawing schematically showing a first aspect of the method for manufacturing an exhaust pipe in accordance with the first embodiment of the present invention.

FIG. 5A shows a base material 10.

(2) Masking (Suppressing Formation of a Coating Film onto a Base Material)

A masking material is applied to a site on the base material in which the thickness of the surface coating layer should be small (herein, a site serving as the character portion). As the masking material, a masking tape, a resin for masking and the like can be used. Since this step is suppressing of the forming of a coating film in forming a first coating film described later at a site to which the masking material has been applied, this step can be said to be a "suppressing of the forming of a coating film onto a base material".

Figure 5B:
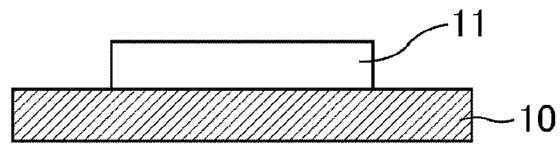

FIG. 5B shows a state where a masking material 11 is applied to a base material 10.

(3) Forming a First Coating Film

Each step will be explained below taking for example the case where a surface coating layer containing a crystalline inorganic material and an amorphous inorganic material is formed.

A crystalline inorganic material and an amorphous inorganic material are mixed to prepare a paint for forming a surface coating layer (hereinafter, also referred to as a raw material composition for a surface coating layer).

Specifically, for example, a powder of the crystalline inorganic material and a powder of the amorphous inorganic material are prepared, respectively, so that they each have a predetermined particle size, shape and the like, and respective powders are mixed at a predetermined blending ratio to prepare a mixed powder. Further, water is added to the mixed powder and the resultant is mixed with a ball mill, thereby, a raw material composition for a surface coating layer is prepared.

Herein, the blending ratio between the mixed powder and water is not particularly limited, but about 100 parts by weight of water is desirable based on about 100 parts by weight of the mixed powder, since in that case, the viscosity is suitable for application to a metal base material. In addition, as necessary, a dispersing medium such as an organic solvent and a binder such as an organic binder may be added to the raw material composition for a surface coating layer.

Then, the raw material composition for a surface coating layer is applied to a surface of the metal base material. As a method of applying the raw material composition for a surface coating layer, for example, a method such as spray coating (atomized spray painting), electrostatic coating, ink jet, transfer using a stamp, a roller or the like, brush coating, or electrocoating can be used.

Alternatively, the raw material composition for a surface coating layer may be applied to the metal base material by immersing the metal base material in the raw material composition for a surface coating layer.

By this step, a coating film is formed only on a site to which a masking material has not been applied.

Figure 5C:
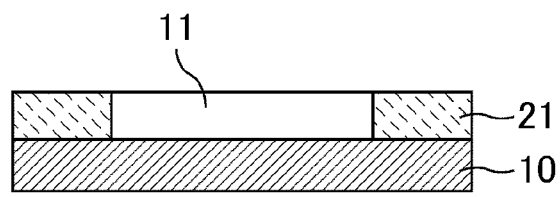

FIG. 5C shows a state where a coating film 21 is formed on a site on the base material 10 to which the masking material 11 has not been applied.

(4) Peeling the Masking Material

The masking material is peeled from the base material. When the masking material is peeled, the base material is exposed at a site to which the masking material has been applied, and a site to which the masking material has not been applied is brought into a state where a coating film is formed. For that reason, a difference in level is formed between the site to which the masking material has been applied, and the site to which the masking material has not been applied.

Figure 5D:
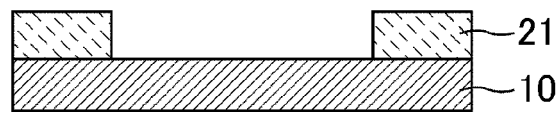

FIG. 5D shows a state where the masking material 11 has been peeled from the base material 10.

(5) Forming a Second Coating Film

In the same manner as in the forming of the first coating film, a raw material composition for a surface coating layer is applied.

In this step, coating films having almost the same thickness are formed on both of a site at which the base material is exposed (site to which the masking material has been applied) and a site on which the coating film is formed (site to which the masking material has not been applied), so as to maintain a difference in level provided in the forming the first coating film.

Figure 5E:
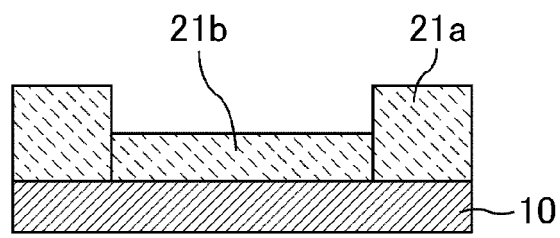

FIG. 5E shows a state where the forming of the second coating film has been performed to form a coating film 21a having a great thickness and a coating film 21b having a small thickness.

(6) Heating

Subsequently, the metal base material to which the raw material composition for a surface coating layer has been applied is heated.

Specifically, after the metal base material to which the raw material composition for a surface coating layer has been applied is dried, the base material is heated and fired, thereby, a surface coating layer is formed.

It is desirable that the heating temperature is the softening point of the amorphous inorganic material or higher, and the heating temperature is desirably from about 300° C. to about 1100° C., although it depends on the kind of the blended amorphous inorganic material. By adopting the temperature not lower than the softening point of the amorphous inorganic material as the heating temperature, the metal base material and the amorphous inorganic material tends to be adhered strongly. As a result, a surface coating layer adhered to the metal base material tends to be strongly formed.

Figure 5F:
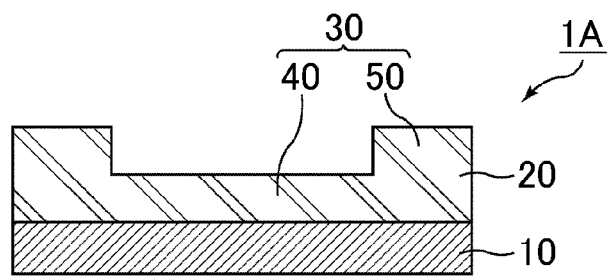

FIG. 5F shows a state where a heating has been performed to form the surface coating layer 20.

A difference in level is provided on the surface coating layer formed by the above-mentioned procedure, a site having a great thickness of the surface coating layer serves as a background portion, and a site having a small thickness of the surface coating layer serves as a character portion. As a result, an information display in which the character portion and the background portion are located in the surface coating layer is formed.

By the above-mentioned procedure, the exhaust pipe 1A shown in FIG. 1 and FIG. 2, which is one example of the exhaust pipe in accordance with the first embodiment of the present invention, can be manufactured.

In the above-mentioned procedure, the masking material was applied to a site serving as the character portion in the masking to make the exhaust pipe 1A shown in FIG. 1 and FIG. 2, but by applying the masking material to a site serving as the background portion and performing the similar step, the exhaust pipe 1B shown in FIG. 3 and FIG. 4 can be manufactured.

Subsequently, a second aspect of the method for manufacturing an exhaust pipe in accordance with the first embodiment of the present invention will be explained.

In this aspect, the above-mentioned procedure of the first aspect of the method for manufacturing an exhaust pipe is changed, and each step is performed in an order of (1) Preparing a base material made of a metal, (2) Forming a first coating film, (3) Masking (suppressing formation of a coating film onto a base material), (4) Forming a second coating film, (5) Peeling the masking material, and (6) Heating.

According to the procedure, in the forming of the first coating film, a coating film having an even thickness is formed on the base material. In the masking, the masking material is applied to a predetermined position on the coating film.

In the forming of the second coating film, a coating film is formed only on a site to which the masking material has not been applied. As a result, a difference in level is formed between a site to which the masking material has been applied, and a site to which the masking material has not been applied, at the time of the forming of the second coating film.

The site to which the masking material is applied may be a site serving as a character portion, or may be a site serving as a background portion.

Subsequently, a third aspect of the method for manufacturing an exhaust pipe in accordance with the first embodiment of the present invention will be explained.

FIG. 6A, FIG. 6B, FIG. 6C and FIG. 6D are a process drawing schematically showing the third aspect of the method for manufacturing an exhaust pipe in accordance with the first embodiment of the present invention, and schematically show a step of making the exhaust pipe 1A shown in FIG. 1 and FIG. 2.

In this aspect, of the above-mentioned procedure of the first aspect of the method for manufacturing an exhaust pipe, (1) Preparing a base material made of a metal, (2) Forming a first coating film, and (3) Heating are performed to form a surface coating layer on a base material and, thereafter, the following steps are performed.

Figure 6A:
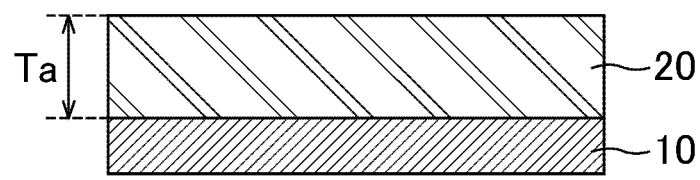
FIG. 6A, FIG. 6B, FIG. 6C, and FIG. 6D are a process drawing schematically showing a third aspect of the method for manufacturing an exhaust pipe in accordance with the first embodiment of the present invention.

FIG. 6A shows a state where the surface coating layer 20 is formed on the base material 10.

The thickness of the surface coating layer 20 is equal to the thickness Ta of a site serving as the background portion 50 of the exhaust pipe 1A to be made.

(4) Masking

A masking material is applied to a site on the surface coating layer in which the thickness of the surface coating layer should be greater.

The site to which a masking material is applied, when the exhaust pipe 1A shown in FIG. 1 is made, is a site serving as the background portion. Conversely, when the exhaust pipe 1B shown in FIG. 3 is made, the site is a site serving as the character portion.

As the masking material, a masking tape, a resin for masking and the like can be used, and the material is preferably a material which endures shotblast described later.

Figure 6B:
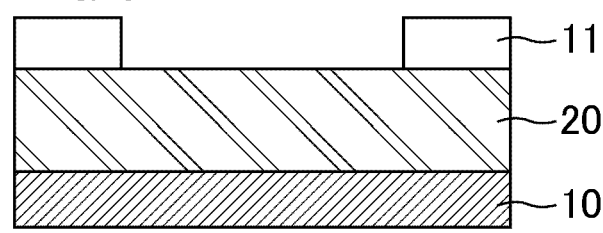

FIG. 6B shows a state where a masking material 11 is applied to the surface coating layer 20.

(5) Shotblast (Removing of Part of the Surface Coating Layer Formed on the Base Material)

Shotblast is performed to scrape and remove the exposed surface coating layer (the surface coating layer at a site to which the masking material is not applied).

By adjusting the conditions (time, shot rate and the like) of shotblast, the scraped amount of the surface coating layer may become easier to be adjusted. In addition, at a stage at which the surface coating layer has been scraped off by a predetermined thickness, shotblast is completed. In this step, the condition of shotblast is adjusted so as to leave the surface coating layer at the scraped portion so that the metal base material is not exposed.

By shotblast, only the surface coating layer at a site to which the masking material is not applied is scraped off.

This step can be said to be a "removing part of the surface coating layer formed on the base material".

Figure 6C:
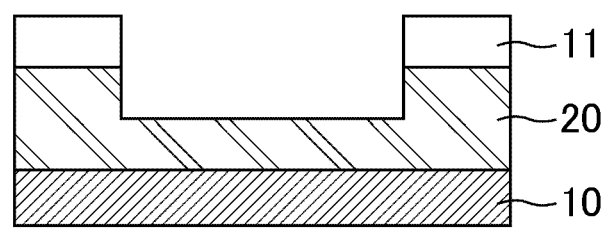

FIG. 6C schematically shows a state where the surface coating layer 20 has been scraped off by shotblast.

(6) Peeling the Masking Material

The masking material is peeled from the surface coating layer. When the masking material is peeled, a site to which the masking material has been applied serves as a site in which the thickness of the surface coating layer is great, and a site to which the masking material has not been applied serves as a site in which the thickness of the surface coating layer is small.

Figure 6D:
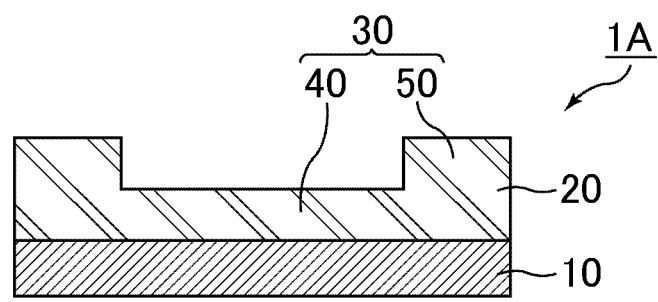

FIG. 6D shows a state where the masking material 11 has been peeled from the surface coating layer 20.

An exhaust pipe made via the above-mentioned steps is the exhaust pipe 1A shown in FIG. 2.

The thus formed site in which the thickness of the surface coating layer is great and site in which the thickness of the surface coating layer is small serve as the character portion or the background portion, and an information display in which the character portion and the background portion are located in the surface coating layer is formed.

Subsequently, a fourth aspect of the method for manufacturing an exhaust pipe in accordance with the first embodiment of the present invention will be explained.

FIG. 7A, FIG. 7B, FIG. 7C, FIG. 7D and FIG. 7E are a process drawing schematically showing the fourth aspect of the method for manufacturing an exhaust pipe in accordance with the first embodiment of the present invention.

In this aspect, of the above-mentioned procedure in the first aspect of the method for manufacturing an exhaust pipe in accordance with the first embodiment of the present invention, (1) Preparing a base material made of a metal and (2) Forming a first coating film are performed to form a coating film on the base material and, thereafter, the following steps are performed.

Figure 7A:
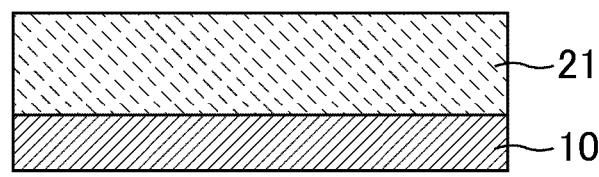
FIG. 7A, FIG. 7B, FIG. 7C, FIG. 7D, and FIG. 7E are a process drawing schematically showing a fourth aspect of the method for manufacturing an exhaust pipe in accordance with the first embodiment of the present invention.

FIG. 7A shows a state where a coating film 21 is formed on the base material 10.

(3) Masking

A masking material is applied to a site on the coating film in which the thickness of the coating film should be increased.

The masking step is the same as the masking step in the third aspect of the method for manufacturing an exhaust pipe in accordance with the first embodiment of the present invention except that a site to which the masking material is applied is not the surface coating layer but the coating film.

Figure 7B:
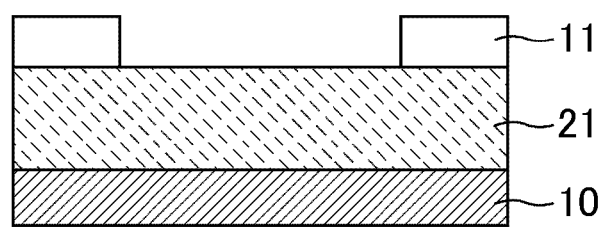

FIG. 7B shows a state where the masking material 11 is applied to the coating film 21.

(4) Shotblast (Removing of Part of the Coating Film Formed on the Base Material)

Shotblast is performed to scrape and remove the exposed coating film (coating film at a site to which the masking material is not applied).

The shotblast is the same as the shotblast in the third aspect of the method for manufacturing an exhaust pipe in accordance with the first embodiment of the present invention except that the subject to be scraped is not the surface coating layer but the coating film.

By shotblast, only the coating film at a site to which the masking material has not been applied is scraped.

This step can be said to be a "removing of part of the coating film formed on the base material".

Figure 7C:
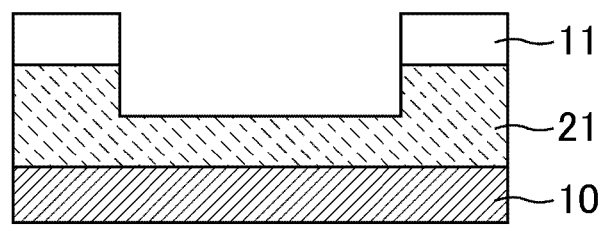

FIG. 7C schematically shows a state where the coating film 21 is scraped off by shotblast.

(5) Peeling the Masking Material

The masking material is peeled from the coating film. When the masking material is peeled, a site to which the masking material has been applied serves as a site in which the thickness of the coating film is great, and a site to which the masking material has not been applied serves as a site in which the thickness of the coating film is small.

Figure 7D:
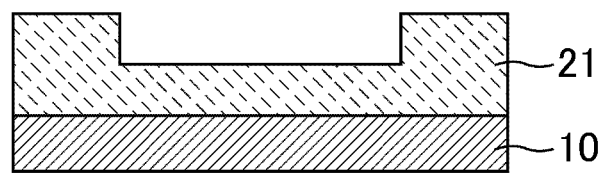

FIG. 7D shows a state where the masking material 11 has been peeled from the coating film 21.

(6) Heating

In the same manner as in the heating in the first aspect of the method for manufacturing an exhaust pipe in accordance with the first embodiment of the present invention, a surface coating layer is formed.

Figure 7E:
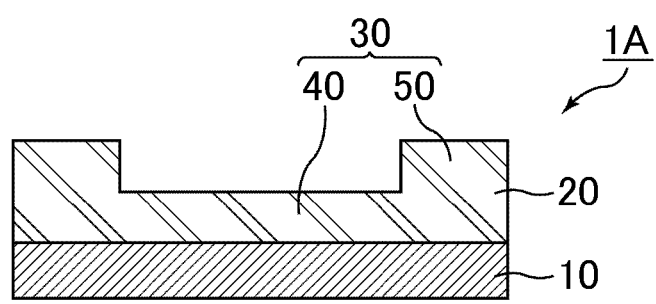

FIG. 7E shows a state where the heating has been performed to form the surface coating layer 20.

An exhaust pipe manufactured via the above-mentioned steps is the exhaust pipe 1A shown in FIG. 2.

The thus formed site in which the thickness of the surface coating layer is great and site in which the thickness of the surface coating layer is small serve as the character portion or the background portion, and an information display in which the character portion and the background portion are located in the surface coating layer is formed.

By the above-mentioned procedure, the exhaust pipe 1A and the exhaust pipe 1B shown in FIG. 1, FIG. 2, FIG. 3 and FIG. 4, which are examples of the exhaust pipe in accordance with the first embodiment of the present invention, can be manufactured.

The effect of the exhaust pipe in accordance with the first embodiment of the present invention, and the method for manufacturing an exhaust pipe in accordance with the first to fourth aspects in accordance with the first embodiment of the present invention will be exemplified below.

(1) The exhaust pipe of the present embodiment has a base material made of a metal, a surface coating layer containing an amorphous inorganic material on a surface of the base material, and an information display including a character portion and a background portion, and at least one of the character portion and the background portion is located in the surface coating layer.

According to this constitution, the information display contains the character portion and the background portion, and at least one of the character portion and the background portion is located in the surface coating layer. Since the surface coating layer contains the amorphous inorganic material, it tends not to vanish by heat applied at operation of an engine. In addition, since the metal base material is not impressed, the exhaust pipe tends not to be damaged by vibration applied at operation of an engine.

(2) In the exhaust pipe of the present embodiment, the thickness of the surface coating layer in the character portion is different from the thickness of the surface coating layer in the background portion.

In the exhaust pipe of the present embodiment, there is a difference in level between the character portion and the background portion.

When there is a difference in level between the character portion and the background portion, a difference between these portions and other sites tends to be felt by a worker only by touch with a hand. For that reason, a difference in level tends to be provided so as to correspond to an attachment position (attachment direction) of the exhaust pipe. As a result, information such as character information as identification information tends to be imparted and, additionally, workability at attachment of the exhaust pipe tends to be further improved.

In addition, since a crack due to thermal shock is easily generated as compared with other sites, portion in which the thickness of the surface coating layer is great as compared with other sites can also serve as a sensor for thermal shock. When there is such a site, endurance to thermal shock may become easier to be confirmed by checking only this site. As a result, conveniently, it is not necessary to check the whole exhaust pipe.

(3) In the exhaust pipe of the present embodiment, the information display shows information about at least one selected from a product name, a product number, a manufacturing number, a product kind, a weight, a product size, an applicable type of vehicle, attention-seeking, contact information and a company name. In addition, a character displayed by the character portion is at least one selected from an alphabet, a digit, a Chinese character, a hiragana character, a katakana character, a symbol and a dot.

Since the information is advantages information which is identifiable to a worker handling the exhaust pipe and the like, it is preferable as an information display provided on the exhaust pipe.

(4) In the exhaust pipe of the present embodiment, the amorphous inorganic material is a low melting point glass having a softening point of from about 300° C. to about 1000° C., and is at least one kind selected from the group consisting of a $SiO_2$—$B_2O_2$—ZnO type glass, a $SiO_2$—$B_2O_2$—$Bi_2O_2$ type glass, a $SiO_2$—PbO type glass, a $SiO_2$—PbO—$B_2O_2$ type glass, a $SiO_2$—$B_2O_2$—PbO type glass, a $B_2O_2$—ZnO—PbO type glass, a $B_2O_2$—ZnO—$Bi_2O_2$ type glass, a $B_2O_2$—$Bi_2O_2$ type glass, a $B_2O_2$—ZnO type glass, a BaO—$SiO_2$ type glass and a $SiO_2$—BaO—$B_2O_2$ type glass.

When the softening point of the low melting point glass is in a range of from about 300° C. to about 1000° C., a strong surface coating layer may become easier to be formed on a surface of a base material made of a metal, by melting the low melting point glass, applying (coating) the melt to a surface of the base material (metal material) the base material) and, thereafter, performing heating and firing treatment.

(5) In the exhaust pipe of the present embodiment, the surface coating layer further contains a crystalline inorganic material, and the crystalline inorganic material contains inorganic particles made of at least one of oxides of manganese, iron, copper, cobalt, chromium and aluminum.

The thermal expansion coefficient of the crystalline inorganic material is low, and the thermal expansion coefficient of the amorphous inorganic material is high. For that reason, by adjusting the blending ratio between the crystalline inorganic material and the amorphous inorganic material, the thermal expansion coefficient of the surface coating layer may become easier to be controlled. Therefore, by bringing thermal expansion coefficients of the surface coating layer and the base material made of a metal close to each other, an adhering force between the surface coating layer and the base material made of a metal tends to be improved.

(6) The method for manufacturing an exhaust pipe of the present embodiment includes forming an information display having a character portion and a background portion, in which at least one of the character portion and the background portion is located in the surface coating layer, on a base material made of a metal, wherein the surface coating layer is formed by forming a coating film by applying a paint containing an amorphous inorganic material, and heating the coating film to a temperature not lower than the softening point of the amorphous inorganic material to form the surface coating layer.

By the above-mentioned steps, the surface coating layer is formed, and an information display in which at least one of the character portion and the background portion is located in the surface coating layer, is formed, thereby, an exhaust pipe including an information display may become easier to be manufactured.

The thus formed information display tends not to vanish by heat applied at operation of an engine. In addition, the exhaust pipe tends not to be damaged by vibration applied at operation of an engine.

(7) In the method for manufacturing an exhaust pipe of the present embodiment, the forming an information display includes at least one of suppressing of the forming of the coating film onto the base material, and removing of part of the coating film or part of the surface coating layer formed on the base material.

In addition, the suppressing of the forming of the coating film onto the base material includes masking the base material.

In addition, the removing of part of the coating film or part of the surface coating layer formed on the base material includes a shotblast.

In these methods, the thickness of the surface coating layer in the character portion may become easier to be different from the thickness of the surface coating layer in the background portion. As a result, identification information may become easier to be displayed by a difference in the thickness of the surface coating layer.

EXAMPLES

Hereinafter, examples more specifically disclosing the first embodiment of the present invention will be shown. However, the present invention is not limited only to these examples.

Example 1

(1) Preparing a Base Material Made of a Metal

As a base material made of a metal, a flat plate-like stainless base material (made of SUS430) of length 100 mm×width 100 mm×thickness 2.0 mm was prepared.

This base material was ultrasonic-cleaned in an alcohol solvent and, subsequently, sandblasted to roughen both the surfaces of the base material. The sandblast was performed for 10 minutes using a #100 $Al_2O_3$ abrasive grain.

When the surface roughness of a surface of the base material was measured using a surface roughness measuring device (Handy Surf E-35B manufactured by Tokyo Seimitsu Co., Ltd.), the surface roughness of a surface of the base material was found to be $Rz_{JIS}$=10.3 μm.

The surface roughness $Rz_{JIS}$ was measured according to JIS B 0601 (2001).

By the treatment, a flat plate-like base material was prepared.

The contents of JIS B 0601 (2001) are incorporated herein by reference in their entirety.

(2) Masking

A masking tape (item's stock number: 851T manufactured by 3M company) was applied to a site serving as a character portion on a surface of the base material.

In the character portion in each example, characters of "IBIDEN" were displayed in the "MS P Gothic" font, a line width of the character of 1 mm, a height of the character (H) of 7 mm and a width (W) of 29 mm.

The width W and the height H of the character portion are a width and a height of a plane having such a shape that the entire character portion is contained, as is shown by a dotted line in FIG. 1.

(3) Forming a First Coating Film
(3-1) Preparation of a Raw Material Composition for a Surface Coating Layer As inorganic particles (crystalline inorganic material), a metal oxide powder including 24 parts by weight of a $MnO_2$ powder, 8 parts by weight of a FeO powder, 4 parts by weight of a CuO powder and 4 parts by weight of a CoO powder was prepared. As a low melting point glass (amorphous inorganic material), 60 parts by weight of a $SiO_2$—BaO—$B_2O_3$ glass powder (K807 manufactured by Asahi Glass Co., Ltd.) having a softening point of 720° C. was prepared.

The metal oxide powder and the glass powder were mixed to prepare a mixed powder.

Subsequently, as a binder, 70 parts by weight of an aqueous methylcellulose solution (product name: METOLOSE-65SH, manufactured by Shin-Etsu Chemical Co., Ltd.) was added to the mixed powder, and they were mixed to prepare a raw material composition for a surface coating layer.

(3-2) Coating with a Raw Material Composition for a Surface Coating Layer

About 0.4 g of the raw material composition for a surface coating layer prepared in (3-1) was applied to the whole surface of the base material including a site to which a masking material had been applied, by spray coating (atomized spray painting).

(4) Peeling the Masking Material

The masking material was peeled from the base material.

(5) Forming a Second Coating Film

About 0.2 g of the raw material composition for a surface coating layer prepared in (3-1) was applied to the whole base material at part of which a surface of the base material was exposed, and to part of which a raw material composition for a surface coating layer had been applied, by spray coating (atomized spray painting).

(6) Heating

The base material to which a raw material composition for a surface coating layer had been applied was dried in a dryer under the conditions of the temperature in the furnace of 160° C. and 60 minutes. Subsequently, the base material was heated and fired in a heating furnace under the conditions of the temperature in the furnace of 850° C. and 20 minutes to form a surface coating layer.

By this step, a sample for property evaluation was made.

In the sample for property evaluation made in Example 1, the thickness of the surface coating layer at the character portion was 5.3 µm, and the thickness of the surface coating layer at the background portion was 15.2 µm.

The thickness of the surface coating layer was measured according to ISO 2178 (Non-magnetic coatings on magnetic substrates—Measurement of coating thickness—Magnetic method).

As a measuring apparatus, a film thickness meter (Dualscope MP40E-S manufactured by Fischer Instruments K.K.) was used.

Concerning this sample for property evaluation, evaluation of identifiability and evaluation of adherability of the surface coating layer were performed by the following procedures.

(Evaluation of Identifiability)

Identifiability of an information display in the character portion and the background portion located in the surface coating layer was evaluated by the following procedures.

Five observers determined and scored visibility of characters with their eyes.

The determination was made in 3 stages (score 5: clearly visible, score 3: visible, score 1: invisible). The average of determination by five observers was calculated, and the score was evaluated as follows: "score 4 or more: good, score 2 or more and less than 4: fair, less than score 2: poor".

The evaluation of identifiability was performed in two ways of immediately after making of a sample for property evaluation (initial state) and after the heating test.

The heating test was performed by repeating 10 cycles, one cycle being heating of a sample to 800° C. by heating of the sample with a heating furnace, and cooling of a sample to 25° C. by placement of the sample into water.

In the sample for property evaluation made in Example 1, the evaluation was "good" in both of in the initial state and after the heating test.

(Evaluation of Adherability of a Surface Coating Layer)

A surface of the sample for property evaluation, which had been subjected to a heating test for evaluating identifiability, was visually observed, and evaluated as "good: dropping out and a crack of a surface coating layer are not observed, poor: dropping out of a surface coating layer is observed".

Evaluation of the sample for property evaluation made in Example 1 was "good".

The characteristics and the evaluation results of the sample for property evaluation made in Example 1 are summarized in Table 1.

In the column of "composition", when the character portion or the background portion is located in the surface coating layer, it is expressed as "surface coating layer".

In the column of "blending ratio", the blending ratio (weight ratio) between an amorphous inorganic material and a crystalline inorganic material in a paint for a surface coating layer is expressed by "amorphous inorganic material: crystalline inorganic material".

The blending ratio in the paint for a surface coating layer used in Example 1 is amorphous inorganic material: crystalline inorganic material=6:4.

That is, concerning the character portion, composition: surface coating layer, blending ratio: 6:4, layer thickness: 5.3 µm, and base material surface roughness: 10.3 µm. Concerning the background portion, composition: surface coating layer, blending ratio: 6:4, layer thickness: 15.2 µm, and base material surface roughness: 10.3 µm.

Identifiability in the initial state: good, identifiability after the heating test: good, and adherability: good.

Example 2

In the masking step in Example 1, the same masking tape as that used in Example 1 was applied to a site serving as a background portion, in place of a site serving as a character portion. The design of the character portion was the same as that in Example 1.

In the same manner as in Example 1 as for the other steps, a sample for property evaluation was made.

In the sample for property evaluation made in Example 2, the thickness of the surface coating layer at the character portion was 16.1 µm, and the thickness of the surface coating layer at the background portion was 4.8 µm.

When evaluation of identifiability was performed, the evaluation was "good" in both of in the initial state and after the heating test.

In addition, evaluation of adherability of the surface coating layer of the sample for property evaluation of Example 2 was "good".

The characteristics and the evaluation results of the sample for property evaluation made in Example 2 are summarized in Table 1.

That is, concerning the character portion, composition: surface coating layer, blending ratio: 6:4, layer thickness:

16.1 μm, and base material surface roughness: 10.3 μm. Concerning the background portion, composition: surface coating layer, blending ratio: 6:4, layer thickness: 4.8 μm, and base material surface roughness: 10.3 μm.

Identifiability in the initial state: good, identifiability after the heating test: good, and adherability: good.

Reference Example 1

In the same manner as in Example 1 except that amounts of raw material compositions for a surface coating layer to be applied in the forming of the first coating film and the forming of the second coating film were both 0.2 g, a sample for property evaluation was made.

The thickness of the surface coating layer at the character portion was 5.1 μm, and the thickness of the surface coating layer at the background portion was 10.2 μm.

A difference between the thickness of the surface coating layer at the character portion and the thickness of the surface coating layer at the background portion was smaller than that of Example 1. For that reason, identifiability evaluation was "fair" in both of in the initial state and after the heating test. In addition, evaluation of adherability of the surface coating layer of the sample for property evaluation of Reference Example 1 was "good".

The characteristics and the evaluation results of the sample for property evaluation made in Reference Example 1 are summarized in Table 1.

That is, concerning the character portion, composition: surface coating layer, blending ratio: 6:4, layer thickness: 5.1 μm, and base material surface roughness: 10.3 μm. Concerning the background portion, composition: surface coating layer, blending ratio: 6:4, layer thickness: 10.2 μm, and base material surface roughness: 10.3 μm.

Identifiability in the initial state: fair, identifiability after the heating test: fair, and adherability: good.

Reference Example 2

In the same manner as in Example 1 except that amounts of the raw material compositions for a surface coating layer to be applied in the forming of the first coating film was changed to 0.2 g, and that in the forming of the second coating film was changed to 0.4 g, respectively.

The thickness of the surface coating layer at the character portion was 9.8 μm, and the thickness of the surface coating layer at the background portion was 15.4 μm.

A difference between the thickness of the surface coating layer at the character portion and the thickness of the surface coating layer at the background portion was smaller than that of Example 1. For that reason, identifiability evaluation was "fair" in both of in the initial state and after the heating test. In addition, evaluation of adherability of the surface coating layer of the sample for property evaluation of Reference Example 2 was "good".

The characteristics and the evaluation results of the sample for property evaluation made in Reference Example 2 are summarized in Table 1.

That is, concerning the character portion, composition: surface coating layer, blending ratio: 6:4, layer thickness: 9.8 μm, and base material surface roughness: 10.3 μm. Concerning the background portion, composition: surface coating layer, blending ratio: 6:4, layer thickness: 15.4 μm, and base material surface roughness: 10.3 μm.

Identifiability in the initial state: fair, identifiability after the heating test: fair, and adherability: good.

Comparative Example 1

The stainless base material (made of SUS430) used in Example 1 was ultrasonic-cleaned in an alcohol solvent to obtain a base material. Sandblast was not performed.

Characters of the same design as those of the character portion in Example 1 were written on this base material with an oil-based marker (Mckee EXTRA FINE, manufactured by ZEBRA CO., LTD.) to form a character portion. A site in which the base material had not been painted with the oil-based marker was adopted as a background portion to make a sample for property evaluation.

Comparative Example 2

For the same base material as that of Comparative Example 1, a site corresponding to the background portion in Comparative Example 1 was painted with an oil-based marker to form a background portion, to make a sample for property evaluation.

A site in which the base material was not painted with an oil-based marker was adopted as a character portion.

In the column of "composition" of the character portion and the background portion, of Comparative Example 1 and Comparative Example 2, a portion where the base material was painted with an oil-based marker was expressed as "base material+oil-based marker". A portion where the base material was not painted with an oil-based marker was expressed as "base material".

Evaluations of identifiability of the samples for property evaluation made in Comparative Example 1 and Comparative Example 2 were "good" in the initial state, however, since the color of the oil-based marker disappeared due to heating, evaluations of identifiability after the heating test were "poor".

In addition, since the surface coating layer was not formed, evaluation of adherability was not performed.

The characteristics and the evaluation results of samples for property evaluation made in Comparative Example 1 and Comparative Example 2 are summarized in Table 1.

In Comparative Example 1 and Comparative Example 2, since the surface coating layer was not formed, columns of "blending ratio" and "layer thickness" in Table 1 were expressed as "-". In addition, since the base material surface roughness was not measured, the column was expressed as "-".

That is, concerning the character portion of Comparative Example 1, composition: base material+oil-based marker, blending ratio: -, layer thickness: -, and base material surface roughness: -. Concerning the background portion of Comparative Example 1, composition: base material, blending ratio: -, layer thickness: -, and base material surface roughness: -.

In Comparative Example 1, identifiability in the initial state: good, identifiability after the heating test: poor, and adherability: -.

Concerning the character portion of Comparative Example 2, composition: base material, blending ratio: -, layer thickness: -, and base material surface roughness: -. Concerning the background portion of Comparative Example 2, composition: base material+oil-based marker, blending ratio: -, layer thickness: -, and base material surface roughness: -.

In Comparative Example 2, identifiability in the initial state: good, identifiability after the heating test: poor, and adherability: -.

Comparative Example 3

A base material (being different only in that the thickness is 0.5 mm) similar to that of Comparative Example 1 was impressed by striking characters of the same design as those of the character portion in Example 1 with a hammer using an English impressing set (manufactured by MonotaRO) to form a character portion, thereby, a sample for property evaluation was made.

A not impressed site was adopted as a background portion.

(Vibration Test)

For the sample for property evaluation made in Comparative Example 3, a vibration test was performed, and evaluation of a crack of the base material due to impression was performed.

The vibration test was performed using a repeated bending vibration fatigue testing machine Model B70TH manufactured by Toyo Seiki Seisaku-sho, Ltd. according to the method described in ASTM D671.

Specifically, the sample was processed into a shape described in ASTM D671, and disposed in a vibration testing machine so that one end thereof is fixed and the other end thereof can be moved up and down. Then, the weight was set so that the strain loaded on the sample became 1000 μm, and a vibration test of $10^7$ cycles was performed. Whether a crack starting from the impression was generated or not on the base material was confirmed visually.

In Table 1, columns of "composition" of the character portion and the background portion of Comparative Example 3 were expressed as "base material+impression", letting the site in which impression was performed on the base material to be a character portion. Letting the site in which impression was not performed on the base material to be a background portion, the column was expressed as "base material".

Evaluation of identifiability of the sample for property evaluation made in Comparative Example 3 was "good" in both of in the initial state and after the heating test.

However, a crack was generated starting from the impression in the base material after a vibration test.

The contents of ASTM D671 are incorporated herein by reference in their entirety.

As a control test, concerning samples for property evaluation of Examples 1 and 2, Reference Examples 1 and 2 as well as Comparative Examples 1 and 2 in which the base material was not impressed, the same vibration test as that performed in Comparative Example 3 was performed. As a result, no crack was generated in base materials of the samples for property evaluation of Examples 1 and 2, Reference Examples 1 and 2 as well as Comparative Examples 1 and 2.

In addition, in Comparative Example 3, since the surface coating layer was not formed, evaluation of adherability was not performed.

The characteristics and the evaluation results of the sample for property evaluation made in Comparative Example 3 are summarized in Table 1.

That is, concerning the character portion, composition: base material+impression, blending ratio: -, layer thickness: -, and base material surface roughness: -. Concerning the background portion, composition: base material, blending ratio: -, layer thickness: -, and base material surface roughness: -.

Identifiability in the initial state: good, identifiability after the heating test: good, and adherability: -.

TABLE 1

| | Character portion | | | | Background portion | | | | Identifiability | | |
|---|---|---|---|---|---|---|---|---|---|---|---|
| | Composition | Blending ratio | Layer thickness (μm) | Base material surface roughness (Rzjis: μm) | Composition | Blending ratio | Layer thickness (μm) | Base material surface roughness (Rzjis: μm) | Initial state | After heating test | Adherability |
| Example 1 | Surface coating layer | 6:4 | 5.3 | 10.3 | Surface coating layer | 6:4 | 15.2 | 10.3 | Good | Good | Good |
| Example 2 | Surface coating layer | 6:4 | 16.1 | 10.3 | Surface coating layer | 6:4 | 4.8 | 10.3 | Good | Good | Good |
| Reference Example 1 | Surface coating layer | 6:4 | 5.1 | 10.3 | Surface coating layer | 6:4 | 10.2 | 10.3 | Fair | Fair | Good |
| Reference Example 2 | Surface coating layer | 6:4 | 9.8 | 10.3 | Surface coating layer | 6:4 | 15.4 | 10.3 | Fair | Fair | Good |
| Comparative Example 1 | Base material + Oil-based marker | — | — | — | Base material | — | — | — | Good | Poor | — |
| Comparative Example 2 | Base material | — | — | — | Base material + Oil-based marker | — | — | — | Good | Poor | — |
| Comparative Example 3 | Base material + Impression | — | — | — | Base material | — | — | — | Good | Good | — |

Blending ratio: Blending ratio (weight ratio) between an amorphous inorganic material and a crystalline inorganic material in a paint for a surface coating layer, expressed by "amorphous inorganic material:crystalline inorganic material"
In Comparative Example 3, a crack starting from the impression was generated on the base material after the vibration test.

In the samples for property evaluation of Examples 1 and 2, an information display including a character portion and a background portion is formed, and the character portion and the background portion are located in a surface coating layer.

In addition, it is thought that information indicated by the character portion could be identified since the thickness of the surface coating layer in the character portion is different from the thickness of the surface coating layer in the background portion. Particularly, in Examples 1 and 2, it is thought that identifiability was excellent in both of in the initial state and after the heating test since a difference in the thickness of the surface coating layer between the character portion and the background portion is 9.9 μm and 11.3 μm, respectively, and as great as 7 μm or more.

In addition, adherability between the surface coating layer and the base material is also good, and no crack or dropping out existed on the surface coating layer after the heating test.

In samples for property evaluation of Comparative Examples 1 and 2, an information display was formed by painting a surface of the base material with an oil-based marker. In samples for property evaluation of Comparative Examples 1 and 2, the color of the oil-based marker disappeared after the heating test, and identifiability was deteriorated.

In the sample for property evaluation of Comparative Example 3, a crack starting from the impression was generated on the base material after the vibration test.

(Second Embodiment)

A second embodiment which is one embodiment of an exhaust pipe of the present invention, and a method for manufacturing the exhaust pipe will be explained below.

The exhaust pipe in accordance with the second embodiment of the present invention is different from the exhaust pipe in accordance with the first embodiment of the present invention in that the character portion or the background portion is an exposed area of the base material.

Figure 8:
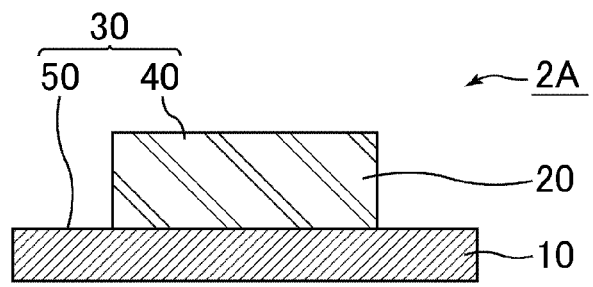
FIG. 8 is a cross-sectional view schematically showing one example of the exhaust pipe in accordance with a second embodiment of the present invention.
Figure 9:
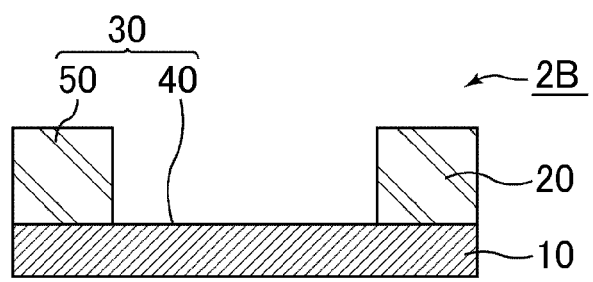
FIG. 9 is a cross-sectional view schematically showing another example of the exhaust pipe in accordance with the second embodiment of the present invention.

FIG. 8 is a cross-sectional view schematically showing one example of the exhaust pipe in accordance with the second embodiment of the present invention, and FIG. 9 is a cross-sectional view schematically showing another example of the exhaust pipe in accordance with the second embodiment of the present invention.

An exhaust pipe 2A shown in FIG. 8 is an example where a background portion 50 is an exposed area of a base material 10.

In the exhaust pipe 2A, a surface coating layer 20 is formed only on part of the base material 10.

A character portion 40 is located in the surface coating layer 20, and an exposed area of the base material 10 at a site in which the surface coating layer 20 is not formed serves as a background portion 50.

An exhaust pipe 2B shown in FIG. 9 is an example where a character portion 40 is an exposed area of a base material 10, contrary to the exhaust pipe 2A.

A background portion 50 is located in a surface coating layer, and an exposed area of the base material 10 at a site in which a surface coating layer 20 is not formed serves as the character portion 40.

As in the exhaust pipe 2A and the exhaust pipe 2B, one of the character portion and the background portion is an exposed area of the base material, and the other of the character portion and the background portion is located in the surface coating layer. For that reason, since the character portion and the background portion are visually recognized discriminably by a worker, information may become easier to be displayed by the character portion and the background portion.

Then, a method for manufacturing an exhaust pipe in accordance with the second embodiment of the present invention will be explained.

The exhaust pipe in accordance with the second embodiment of the present invention can be manufactured by performing (1) Preparing a base material made of a metal, (2) Masking, (3) Forming a first coating film, and (4) Peeling the masking material, and performing (5) Heating without performing the forming of the second coating, in the first embodiment of the method for manufacturing an exhaust pipe in accordance with the first embodiment of the present invention.

Alternatively, the exhaust pipe in accordance with the second embodiment of the present invention can be manufactured by adjusting the condition of shotblast so as to expose the base material in a "shotblast step" of a third aspect or a fourth aspect of the method for manufacturing an exhaust pipe in accordance with the first embodiment of the present invention.

The exhaust pipe in accordance with the second embodiment of the present invention, and the method for manufacturing an exhaust pipe in accordance with the second embodiment of the present invention can exert the effects (1) and (3) to (6) of the exhaust pipe and the method for manufacturing an exhaust pipe in accordance with the first embodiment of the present invention.

In addition, the following effects can be exerted.

(8) In the exhaust pipe of the present embodiment, one of the character portion and the background portion is an exposed area of the base material, and the other of the character portion and the background portion is located in the surface coating layer.

That is, in the exhaust pipe of the present embodiment, there is a difference in level between the character portion and the background portion.

When there is a difference in level between the character portion and the background portion, a difference from other sites tends to be felt by a worker only by touch with a hand. For that reason, the difference in level may become easier to be provided so as to correspond to an attachment position (attachment direction) of the exhaust pipe. As a result, information such as character information as identification information may become easier to be imparted and, further, workability at attachment of the exhaust pipe tends to be improved.

In addition, since a crack due to thermal shock is easily generated as compared with other sites at a site in which the thickness of the surface coating layer is great as compared with other sites, the site can also serve as a sensor for thermal shock. When there is such a site, endurance to thermal shock may become easier to be confirmed by checking only this site. For that reason, conveniently, it is not necessary to check the whole exhaust pipe.

(9) In the method for manufacturing an exhaust pipe of the present embodiment, the forming an information display includes at least one of suppressing of the forming of the coating film onto the base material, and removing of part of the coating film or part of a surface coating layer formed on the base material.

In addition, the suppressing of the forming of the coating film onto the base material includes masking the base material. In addition, the removing of part of the coating film or part of the surface coating layer formed on the base material includes a shotblast.

In these methods, one of the character portion and the background portion can be served as an exposed area of a base material.

In addition, by a difference in the thickness of the surface coating layer, identification information may become easier to be displayed.

Examples more specifically disclosing the second embodiment of the present invention will be shown below. However, the present invention is not limited to only these examples.

Example 3

(1) Preparing a Base Material Made of a Metal

In the same manner as in "(1) Preparing a base material made of a metal" of Example 1, a flat plate-like base material was made.

(2) Coating Film Forming

In the same manner as in "(3-1) Preparation of a raw material composition for a surface coating layer" of Example 1, a raw material composition for a surface coating layer was prepared. About 0.2 g of the raw material composition for a surface coating layer was applied to the whole surface of the metal base material prepared in (1) by spray coating (atomized spray painting).

(3) Heating

The base material to which the raw material composition for a surface coating layer had been applied was dried in a dryer under the conditions of the temperature in the furnace of 160° C. and 60 minutes. Subsequently, the base material was heated and fired in a heating furnace under the conditions of the temperature in the furnace of 850° C. and 20 minutes to form a surface coating layer.

(4) Masking

A masking tape (item's stock number: 851T manufactured by 3M company) was applied to a site serving as a character portion on a surface of the surface coating layer. The design of the character portion was the same as that of Example 1.

(5) Shotblast (Removing of Part of the Surface Coating Layer Formed on the Base Material)

Shotblast was performed until a surface of the metal base material was exposed at a site to which the masking material had not been applied.

Exposure of the metal base material was confirmed visually.

(6) Peeling the Masking Material

The masking material was peeled from the base material.

By the above-mentioned steps, a sample for property evaluation was made.

In the sample for property evaluation, a site from which the masking material had been peeled served as a character portion after peeling, and a portion at which the metal base material had been exposed served as a background portion.

Then, in the same manner as in Example 1, evaluation of identifiability, and adherability of the surface coating layer was performed.

In the sample for property evaluation made in Example 3, the thickness of the surface coating layer at the character portion was 6.1 μm, and the thickness of the surface coating layer at the background portion was 0.0 μm.

When evaluation of identifiability was performed concerning the sample for property evaluation made in Example 3, the evaluation was "good" in both of in the initial state and after the heating test. In addition, evaluation of adherability of the surface coating layer of the sample for property evaluation of Example 3 was "good".

The characteristics and the evaluation results of the sample for property evaluation made in Example 3 are summarized in Table 2.

In Example 3, since the background portion is not located in the surface coating layer, and is a portion at which the metal base material is exposed, the column of "composition" in the background portion is expressed as "base material".

That is, concerning the character portion, composition: surface coating layer, blending ratio: 6:4, layer thickness: 6.1 μm, and base material surface roughness: 10.3 μm. Concerning the background portion, composition: base material, blending ratio: -, layer thickness: 0.0 μm, and base material surface roughness: 10.3 μm.

Identifiability in the initial state: good, identifiability after the heating test: good, and adherability: good.

Example 4

In the masking in Example 3, the same masking tape as that used in Example 3 was applied to a site serving as a background portion, in place of a site serving as a character portion. The design of the character portion was the same as that of Example 3.

In the same manner as in Example 3 as for the other steps, a sample for property evaluation was made.

Then, in the same manner as in Example 1, evaluation of identifiability, and adherability of the surface coating layer was performed.

In the sample for property evaluation made in Example 4, the thickness of the surface coating layer at the character portion was 0.0 μm, and the thickness of the surface coating layer at the background portion was 5.2 μm.

When evaluation of identifiability was performed concerning the sample for property evaluation made in Example 4, the evaluation was "good" in both of in the initial state and after the heating test.

In addition, evaluation of adherability of the surface coating layer of the sample for property evaluation of Example 4 was "good".

The characteristics and the evaluation results of the sample for property evaluation made in Example 4 are summarized in Table 2.

In Example 4, since the character portion is not located in the surface coating layer, and is a site at which the metal base material is exposed, the column of "composition" in the character portion is expressed as "base material".

That is, concerning the character portion, composition: base material, blending ratio: -, layer thickness: 0.0 μm, and base material surface roughness: 10.3 μm. Concerning the background portion, composition: surface coating layer, blending ratio: 4:4, layer thickness: 5.2 μm, and base material surface roughness: 10.3 μm.

Identifiability in the initial state: good, identifiability after the heating test: good, and adherability: good.

TABLE 2

| | Character portion | | | | Background portion | | | | Identifiability | | |
|---|---|---|---|---|---|---|---|---|---|---|---|
| | Composition | Blending ratio | Layer thickness (μm) | Base material surface roughness (Rzjis: μm) | Composition | Blending ratio | Layer thickness (μm) | Base material surface roughness (Rzjis: μm) | Initial state | After heating test | Adherability |
| Example 3 | Surface coating layer | 6:4 | 6.1 | 10.3 | Base material | — | 0.0 | 10.3 | Good | Good | Good |

TABLE 2-continued

| | Character portion | | | | Background portion | | | | Identifiability | | |
|---|---|---|---|---|---|---|---|---|---|---|---|
| | | | | Base material | | | | Base material | | | |
| | | | Layer | surface | | | Layer | surface | | After | |
| | Compo- | Blending | thick-ness | roughness | Compo- | Blending | thick-ness | roughness | Initial | heating | Adher- |
| | sition | ratio | (μm) | (Rzjis: μm) | sition | ratio | (μm) | (Rzjis: μm) | state | test | ability |
| Example 4 | Base material | — | 0.0 | 10.3 | Surface coating layer | 6:4 | 5.2 | 10.3 | Good | Good | Good |

Blending ratio: Blending ratio (weight ratio) between an amorphous inorganic material and a crystalline inorganic material in a paint for a surface coating layer, expressed by "amorphous inorganic material:crystalline inorganic material"

In the samples for property evaluation of Examples 3 and 4, identifiability was excellent in both of in the initial state and after the heating test.

In addition, in the samples for property evaluation of Examples 3 and 4, adherability between the surface coating layer and the base material was also good, and no crack or dropping out existed in the surface coating layer after the heating test.

(Third Embodiment)

A third embodiment which is one embodiment of an exhaust pipe of the present invention, and a method for manufacturing the exhaust pipe will be explained below.

In the exhaust pipe in accordance with the third embodiment of the present invention, the chemical composition of the surface coating layer in the character portion is different from the chemical composition of the surface coating layer in the background portion.

Figure 10:
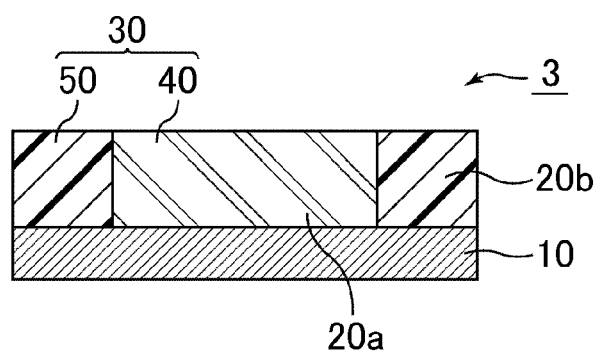
FIG. 10 is a cross-sectional view schematically showing one example of the exhaust pipe in accordance with a third embodiment of the present invention.

FIG. 10 is a cross-sectional view schematically showing one example of the exhaust pipe in accordance with the third embodiment of the present invention.

In an exhaust pipe 3 shown in FIG. 10, the chemical composition of a surface coating layer 20a in a character portion 40 is different from that of a surface coating layer 20b in a background portion 50 are different. In FIG. 10, being different in the chemical composition of the surface coating layer is shown by hatching.

When the chemical composition is different in the surface coating layer, the appearance thereof is different. There are cases where the color tone is different, or where the luster is different.

When the appearance is different between the character portion and the background portion, the character portion and the background portion are visually recognized discriminably by a worker. For that reason, information may become easier to be displayed by the character portion and the background portion.

In addition, when the chemical composition is different in the surface coating layer, there are cases where the surface roughness is different. In that case, information may become easier to be recognized by a worker only by touch with a hand.

Examples of a combination of chemical compositions of the surface coating layer include an example in which in one of the character portion and the background portion, the surface coating layer has a composition containing an amorphous inorganic material and a crystalline inorganic material, and in the other of the character portion and the background portion, the surface coating layer has a composition consisting of an amorphous inorganic material.

Examples of the combination also include an example in which the amorphous inorganic material is different between the character portion in the surface coating layer and the background portion in the surface coating layer, an example in which the crystalline inorganic material is different between those portions, an example in which both of the amorphous inorganic material and the crystalline inorganic material are different between those portions, an example in which the amount of the crystalline inorganic material relative to the amount of the amorphous inorganic material is different between those portions, and combinations of these examples.

Then, the method for manufacturing an exhaust pipe in accordance with a third embodiment of the present invention will be explained.

The exhaust pipe in accordance with the third embodiment of the present invention can be manufactured by using a plurality of kinds of raw material compositions for a surface coating layer (hereinafter, also referred to as paints) and applying different paints onto a site of the base material serving as the character portion and a site of the base material serving as the background portion.

As one example of a method of applying different paints to a site of the base material serving as the character portion and a site of the base material serving as the background portion, an example using a paint A containing an amorphous inorganic material and a crystalline inorganic material, and a paint B containing an amorphous inorganic material and not containing a crystalline inorganic material, as a plurality of kinds of paints, will be shown.

In addition, an example using electrocoating as a coating method will be shown.

(1) Preparing a Base Material Made of a Metal

In the same manner as in the method for manufacturing an exhaust pipe of the first embodiment of the present invention, a base material made of a metal is prepared.

(2) Preparing an Electrocoating Paint A

A powder of an amorphous inorganic material and a powder of a crystalline inorganic material are mixed, further, an electrocoating resin is added to the mixed powder, they are mixed and, thereafter, pure water is added thereto to prepare a raw material composition A for a surface coating layer (hereinafter, referred to as an electrocoating paint A).

As the electrocoating resin, an anion-type electrocoating resin or a cation-type electrocoating resin can be used.

Examples of the anion-type electrocoating resin include an acrylic resin, an epoxy resin, a polyurethane resin, a maleinized oil, a polyester resin and a polybutadiene resin having a functional group such as a carboxyl group, a sulfonic acid group, and a phosphoric acid group.

Examples of the cation-type electrocoating resin include an acrylic resin, an epoxy resin, a polyester resin and the like having an amino group, a sulfide group, a phosphine group and the like.

(3) Preparing an Electrocoating Paint B

An electrocoating resin is added to a powder of an amorphous inorganic material, they are mixed and, thereafter, pure water is added thereto to prepare a raw material composition B for a surface coating layer (hereinafter, referred to as an electrocoating paint B).

The amorphous inorganic material and the electrocoating resin used in preparing the electrocoating paint B may be the same as, or different from the electrocoating resin used in preparing the electrocoating paint A.

(4) First Masking (Suppressing Formation of a Coating Film onto a Base Material)

By applying a masking material to a site serving as a background portion on a base material, masking is performed.

(5) Forming a First Coating Film

The base material which has been subjected to masking, and an electrode plate are arranged in the electrocoating paint A, and a voltage is applied to the base material and the electrode plate to perform electrocoating. The electrocoating paint A is applied to a site which has not been subjected to masking (site serving as the character portion).

(6) First Drying and Curing

By heating the base material to which the electrocoating paint A has been applied by step (5) at a temperature in the furnace of from about 100° C. to about 200° C. for from about 5 minutes to about 90 minutes in a dryer, a coating film of the electrocoating paint A formed on a surface of the base material is dried and cured.

(7) First Masking Peeling

The masking material applied to the base material is peeled.

(8) Second Masking (Suppressing Formation of a Coating Film onto a Base Material)

By applying a masking material to the electrocoating paint A (site serving as a character portion) applied to the base material, masking is performed.

(9) Forming of a Second Coating Film

The base material which has been subjected to masking, and an electrode plate are arranged in the electrocoating paint B, and a voltage is applied to the base material and the electrode plate to perform electrocoating. The electrocoating paint B is applied to a site which has not been subjected to masking (site serving as the background portion).

(10) Second Drying and Curing

By heating the base material to which the electrocoating paint B has been applied by step (9) at a temperature in the furnace of from about 100° C. to about 200° C. for from about 5 minutes to about 90 minutes in a dryer, a coating film of the electrocoating paint B formed on a surface of the metal base material is dried and cured.

(11) Second Masking Peeling

The masking material applied to the electrocoating paint A is peeled.

(12) Heating

In the same manner as in the heating in the first embodiment of the present invention, the base material to which the electrocoating paint A and the electrocoating paint B have been applied is heated and fired, to form a surface coating layer.

By this procedure, the exhaust pipe 3 in accordance with the present embodiment can be manufactured.

In addition, contrary to this example, it is also possible to perform masking on a site serving as the character portion in the first masking, and to perform electrocoating to a site serving as the background portion in the forming of first coating film.

The exhaust pipe in accordance with the third embodiment of the present invention, and the method for manufacturing an exhaust pipe can exert the effects (1) and (3) to (6) of the exhaust pipe in accordance with the first embodiment of the present invention, and the method for manufacturing an exhaust pipe.

In addition, the following effects can be exerted.

(10) In the exhaust pipe of the present embodiment, the chemical composition of the surface coating layer in the character portion is different from the chemical composition of the surface coating layer in the background portion.

When the chemical composition of the surface coating layer is different between the character portion and the background portion, the appearance of the surface coating layer is different between the character portion and the background portion. For that reason, the character portion and the background portion are visually recognized discriminably by a worker. As a result, information may become easier to be displayed by a difference in the appearance between the character portion and the background portion.

(11) In the method for manufacturing an exhaust pipe of the present embodiment, the suppressing of the forming of the coating film onto a base material includes at least one of masking the base material, and forming a material repelling a paint on the base material, and a plurality of kinds of paints having different chemical compositions are used in the forming of the coating film.

According to such a method, the chemical composition of the surface coating layer in the character portion tends to be different from the chemical composition of the surface coating layer in the background portion.

For that reason, information may become easier to be displayed by a difference in the appearance between the character portion and the background portion.

Examples more specifically disclosing the third embodiment of the present invention will be shown below. However, the present invention is not limited to only these examples.

Example 5

(1) Preparing a Base Material Made of a Metal

In the same manner as in "(1) Preparing a base material made of a metal" of Example 1, a flat plate-like base material was made.

(2) Preparing an Electrocoating Paint A

In the same manner as in "(3-1) Preparation of a raw material composition for a surface coating layer" of Example 1, a metal oxide powder and a glass powder were mixed to make a mixed powder.

By adding a monomer composition, a solvent and a polymerization initiator to a reaction vessel, and polymerizing the monomer composition, an anion-type electrocoating resin was made. Specifically, as the monomer composition, 13 parts by weight of ethyl acrylate, 30 parts by weight of 2-ethylhexyl methacrylate, 31 parts by weight of methyl methacrylate, 9 parts by weight of acrylic acid, 17 parts by weight of 2-hydroxyethyl acrylate, and 4 parts by weight of N-methylolmethacrylamide were added. As a solvent, 54 parts by weight of isopropyl alcohol (IPA) and 15 parts by weight of butyl cellosolve were added. As the polymerization initiator, 3 parts by weight of azobisisobutyronitrile was added.

To 100 parts by weight of a mixed powder of a metal oxide powder and a glass powder was added 170 parts by weight of the anion-type electrocoating resin obtained by the polymerization and, after mixing, pure water was added thereto to prepare an electrocoating paint A having a solid content concentration of 15%.

(3) Preparing an Electrocoating Paint B

60 Parts by weight of a $SiO_2$—BaO—$B_2O_3$ type glass powder (K807, manufactured by Asahi Glass Co., Ltd.) having a softening point of 720° C. was prepared, 100 parts by weight of the anion-type electrocoating resin explained in "(2) Preparing an electrocoating paint A" was added to this glass powder and mixed with each other and, thereafter, pure water was added thereto and mixed with each other, to prepare an electrocoating paint B having a solid content concentration of 15%.

(4) First Masking

A masking tape (item's stock number: 851T manufactured by 3M company) was applied to a site serving as a background portion, on the base material.

(5) Forming a First Coating Film

The electrocoating paint A made in step (2) was applied to a surface of the base material which had been subjected to masking in (4) by electrocoating. Specifically, the base material and an electrode plate were arranged in the electrocoating paint A, and a voltage was applied by making the base material function as an anode and the electrode plate function as a cathode.

Electrocoating was performed at a voltage of 100 V and a bath temperature of 26 to 32° C. for an electric conduction time of 3 minutes using a rotary stirrer in the state where the electrocoating paint A was stirred.

As a result, the electrocoating paint A was applied to a site which had not been subjected to masking (site serving as the character portion).

(6) First Drying and Curing

By heating the base material to which the electrocoating paint A had been applied by step (5) at a temperature in the furnace of 160° C. for 60 minutes in a dryer, the coating film of the electrocoating paint A formed on a surface of the base material was dried and cured.

(7) First Masking Peeling

The masking material was peeled from the base material.

(8) Second Masking

A masking tape (item's stock number: 851T manufactured by 3M company) was applied to the electrocoating paint A (site serving as the character portion) applied to the base material.

(9) Forming of a Second Coating Film

The electrocoating paint B made in step (3) was applied to a surface of the base material which had been subjected to masking in (8) by electrocoating. The method of electrocoating is the same as that of the forming of the first coating film and, as a result, the electrocoating paint B was applied to a site which had not been subjected to masking (site serving as the background portion).

(10) Second Drying and Curing

In the same manner as in the first drying and curing, the coating film of the electrocoating paint B formed on a surface of the base material was dried and cured.

(11) Second Masking Peeling

The masking material was peeled from the base material.

(12) Heating

The base material to which the electrocoating paint A and the electrocoating paint B had been applied was heated at a temperature in the furnace of 400° C. for 60 minutes in a heating furnace and, subsequently, heated and fired at a temperature in the furnace of 850° C. for 20 minutes, to form a surface coating layer.

By the above-mentioned steps, a sample for property evaluation was made.

Then, in the same manner as in Example 1, evaluation of identifiability, and adherability of the surface coating layer was performed.

The blending ratio between an amorphous inorganic material and a crystalline inorganic material in the character portion of the sample is amorphous inorganic material:crystalline inorganic material=6:4.

On the other hand, the blending ratio between an amorphous inorganic material and a crystalline inorganic material in the background portion is amorphous inorganic material:crystalline inorganic material=6:0.

In addition, the thickness of the surface coating layer at the character portion was 5.0 μm, and the thickness of the surface coating layer at the background portion was 4.2 μm.

When evaluation of identifiability was performed concerning the sample for property evaluation of Example 5, the evaluation was "good" in both of in the initial state and after the heating test. In addition, evaluation of adherability of the surface coating layer of the sample for property evaluation of Example 5 was "good".

The characteristics and the evaluation results of the sample for property evaluation made in Example 5 are summarized in Table 3.

That is, concerning the character portion, composition: surface coating layer, blending ratio: 6:4, layer thickness: 5.0 μm, and base material surface roughness: 10.3 μm. Concerning the background portion, composition: surface coating layer, blending ratio: 6:0, layer thickness: 4.2 μm, and base material surface roughness: 10.3 μm.

Identifiability in the initial state: good, identifiability after the heating test: good, and adherability: good.

Example 6

In the same manner as in Example 5 except that the electrocoating paint B was used in the forming of the first coating film, and the electrocoating paint A was used in the forming of the second coating film, a sample for property evaluation was made.

Then, in the same manner as in Example 1, evaluation of identifiability, and adherability of the surface coating layer was performed.

The blending ratio between an amorphous inorganic material and a crystalline inorganic material in the character portion of the sample is amorphous inorganic material:crystalline inorganic material=6:0.

On the other hand, the blending ratio between an amorphous inorganic material and a crystalline inorganic material in the background portion is amorphous inorganic material:crystalline inorganic material=6:4.

In addition, the thickness of the surface coating layer at the character portion was 6.2 μm, and the thickness of the surface coating layer at the background portion was 6.4 μm.

When evaluation of identifiability was performed concerning the sample for property evaluation of Example 6, the evaluation was "good" in both of in the initial state and after the heating test. In addition, evaluation of adherability of the surface coating layer of the sample for property evaluation of Example 6 was "good".

The characteristics and the evaluation results of the sample for property evaluation made in Example 6 are summarized in Table 3.

That is, concerning the character portion, composition: surface coating layer, blending ratio: 6:0, layer thickness: 6.2 μm, and base material surface roughness: 10.3 μm. Concerning the background portion, composition: surface coating layer, blending ratio: 6:4, layer thickness: 6.4 μm, and base material surface roughness: 10.3 μm.

Identifiability in the initial state: good, identifiability after the heating test: good, and adherability: good.

Reference Example 3

In the same manner as in Example 5 except that an electrocoating paint C having a different chemical composition was used in place of the electrocoating paint B, a sample for property evaluation was made. Then, in the same manner as in Example 1, evaluation of identifiability, and adherability of the surface coating layer was performed.

The electrocoating paint C was prepared as follows.

As inorganic particles (crystalline inorganic material), a total of 20 parts by weight of a metal oxide powder including 12 parts by weight of a $MnO_2$ powder, 4 parts by weight of a FeO powder, 2 parts by weight of a CuO powder and 2 parts by weight of a CoO powder was prepared.

60 Parts by weight of a $SiO_2$—BaO—$B_2O_3$ type glass powder (K807, manufactured by Asahi Glass Co., Ltd.) having a softening point of 720° C. was prepared. Then, the metal oxide powder and the glass powder were mixed to make a mixed powder.

To 80 parts by weight of the mixed powder of the metal oxide powder and the glass powder was added 133 parts by weight of the anion-type electrocoating resin explained in "Example 5, (2) Preparing an electrocoating paint A", they were mixed and, thereafter, pure water was added thereto and mixed with each other, to prepare the electrocoating paint C having a solid content concentration of 15%.

The blending ratio between an amorphous inorganic material and a crystalline inorganic material in the character portion of the sample is amorphous inorganic material:crystalline inorganic material=6:4.

On the other hand, the blending ratio between an amorphous inorganic material and a crystalline inorganic material in the background portion is amorphous inorganic material:crystalline inorganic material=6:2.

In addition, the thickness of the surface coating layer at the character portion was 5.2 μm, and the thickness of the surface coating layer at the background portion was 5.4 μm.

When evaluation of identifiability was performed concerning the sample for property evaluation of Reference Example 3, the evaluation was "fair" in both of in the initial state and after the heating test. In addition, evaluation of adherability of the surface coating layer of the sample for property evaluation of Reference Example 3 was "good".

The characteristics and the evaluation results of the sample for property evaluation made in Reference Example 3 are summarized in Table 3.

That is, concerning the character portion, composition: surface coating layer, blending ratio: 6:4, layer thickness: 5.2 μm, and base material surface roughness: 10.3 μm. Concerning the background portion, composition: surface coating layer, blending ratio: 6:2, layer thickness: 5.4 μm, and base material surface roughness: 10.3 μm.

Identifiability in the initial state: fair, identifiability after the heating test: fair, and adherability: good.

TABLE 3

| | Character portion | | | | Background portion | | | | Identifiability | | |
|---|---|---|---|---|---|---|---|---|---|---|---|
| | Composition | Blending ratio | Layer thickness (μm) | Base material surface roughness (Rzjis: μm) | Composition | Blending ratio | Layer thickness (μm) | Base material surface roughness (Rzjis: μm) | Initial state | After heating test | Adherability |
| Example 5 | Surface coating layer | 6:4 | 5.0 | 10.3 | Surface coating layer | 6:0 | 4.2 | 10.3 | Good | Good | Good |
| Example 6 | Surface coating layer | 6:0 | 6.2 | 10.3 | Surface coating layer | 6:4 | 6.4 | 10.3 | Good | Good | Good |
| Reference Example 3 | Surface coating layer | 6:4 | 5.2 | 10.3 | Surface coating layer | 6:2 | 5.4 | 10.3 | Fair | Fair | Good |

Blending ratio: Blending ratio (weight ratio) between an amorphous inorganic material and a crystalline inorganic material in a paint for a surface coating layer, expressed by "amorphous inorganic material:crystalline inorganic material"

In the samples for property evaluation of Examples 5 and 6, since a difference in the compositional ratio in the surface coating layer serving as the character portion and the background portion is great, such as 6:4 at the character portion and 6:0 at the background portion, or 6:0 at the character portion and 6:4 at the background portion, respectively, it is thought that identifiability was excellent in both of in the initial state and after the heating test.

In addition, in the samples for property evaluation of Examples 5 and 6, adherability between the surface coating layer and the base material was also good, and no crack or dropping out existed on the surface coating layer after the heating test.

(Fourth Embodiment)

A fourth embodiment which is one embodiment of an exhaust pipe of the present invention, and a method for manufacturing the exhaust pipe will be explained below.

In the exhaust pipe in accordance with the fourth embodiment of the present invention, in at least one of the character portion and the background portion, a plurality of layers having chemical compositions different in a thickness direction are laminated.

Figure 11:
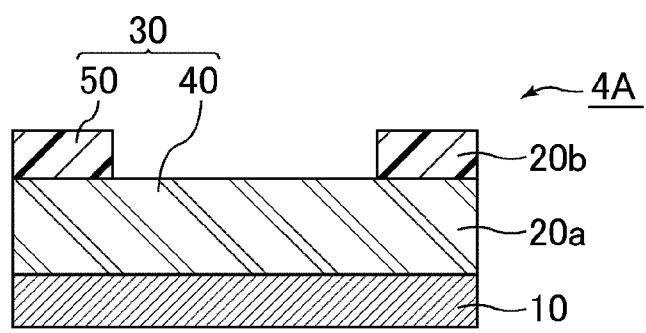
FIG. 11 is a cross-sectional view schematically showing one example of the exhaust pipe in accordance with a fourth embodiment of the present invention.
Figure 12:
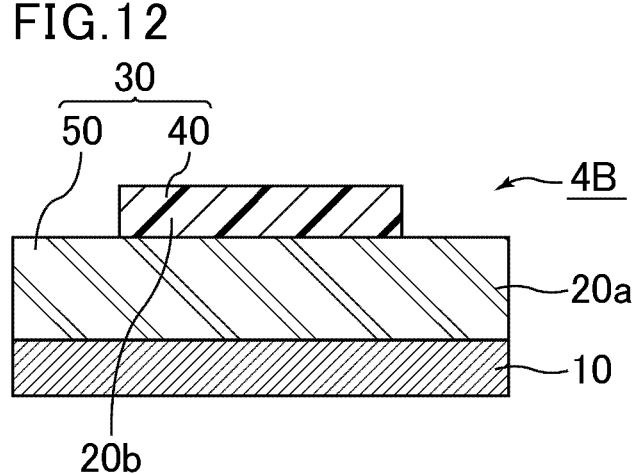
FIG. 12 is a cross-sectional view schematically showing another example of the exhaust pipe in accordance with the fourth embodiment of the present invention.

FIG. 11 is a cross-sectional view schematically showing one example of the exhaust pipe in accordance with the fourth embodiment of the present invention, and FIG. 12 is a cross-sectional view schematically showing another example of the exhaust pipe in accordance with the fourth embodiment of the present invention.

In an exhaust pipe 4A shown in FIG. 11, a background portion 50 includes a surface coating layer 20*a* and a surface coating layer 20*b* having different chemical compositions, which are laminated. A character portion 40 is the surface coating layer 20*a*.

On the other hand, in an exhaust pipe 4B shown in FIG. 12, a character portion 40 includes a surface coating layer 20a and a surface coating layer 20b having different chemical compositions, which are laminated. A background portion 50 is the surface coating layer 20a.

In the exhaust pipe 4A and the exhaust pipe 4B, as in the exhaust pipe of the first embodiment of the present invention, the thickness of the surface coating layer in the character portion is different from the thickness of the surface coating layer in the background portion. Further, as in the exhaust pipe of the third embodiment of the present invention, the chemical composition of the surface coating layer in the character portion is different from the chemical composition of the surface coating layer in the background portion. For that reason, since the character portion and the background portion are visually recognized discriminably by a worker, information may become easier to be displayed by a difference in the thickness and a difference in the appearance between the character portion and the background portion.

A combination of chemical compositions of the surface coating layer can be made to be the same as that of the example explained in the exhaust pipe of the third embodiment of the present invention.

Then, the method for manufacturing an exhaust pipe in accordance with a fourth embodiment of the present invention will be explained.

Examples of the method for manufacturing an exhaust pipe in accordance with the fourth embodiment of the present invention include a method of using raw material compositions for a surface coating layer having different chemical compositions, in the forming of the first coating film and forming of the second coating film, in the second aspect of the method for manufacturing an exhaust pipe of the first embodiment of the present invention.

Specifically, in the forming of the first coating film, a coating film serving as the surface coating layer 20a is formed on the whole base material, the heating in the first embodiment of the present invention is performed to form the surface coating layer 20a, and a masking material is applied to a predetermined position of the surface coating layer 20a.

In the forming of the second coating film, using a raw material composition for a surface coating layer having a different chemical composition from that of the raw material composition for a surface coating layer used in the forming of the first coating film, a coating film serving as the surface coating layer 20b is formed only on a site to which the masking material is not applied. Thereafter, a heating is performed to form the surface coating layer 20b.

As a result, a difference in level is formed between a site to which the masking material has been applied at the time of the forming of the second coating film, and a site to which the masking material has not been applied at that time. In addition, the chemical composition of the surface coating layer in the character portion is different from the chemical composition of the surface coating layer in the background portion.

A site to which the masking material is applied may be a site serving as the character portion, or may be a site serving as the background portion.

The exhaust pipe in accordance with the fourth embodiment of the present invention, and the method for manufacturing an exhaust pipe can exert the effects (1) to (6) of the exhaust pipe in accordance with the first embodiment of the present invention, and the method for manufacturing an exhaust pipe, and the effect (10) of the exhaust pipe in accordance with the third embodiment of the present invention.

In addition, the following effect can be exerted.
(12) In the method for manufacturing an exhaust pipe of the present embodiment, forming an information display includes a suppressing of the forming of the coating film onto the base material.

The suppressing of the forming of the coating film onto the base material includes masking the base material.

In the forming of the coating film, a plurality of kinds of paints having different chemical compositions are used.

According to such a method, the thickness and the chemical composition of the surface coating layer in the character portion tends to be different from the thickness and the chemical composition of the surface coating layer in the background portion.

In addition, information may become easier to be displayed by a difference in the thickness and a difference in the appearance of the surface coating layer.

Examples more specifically disclosing the fourth embodiment of the present invention will be shown below. However, the present invention is not limited to only these examples.

Example 7

(1) Preparing a Base Material Made of a Metal
In the same manner as in "(1) Preparing a base material made of a metal" of Example 1, a flat plate-like base material was made.
(2-1) Preparation of a Raw Material Composition a for a Surface Coating Layer
In the same manner as in "(3-1) Preparation of a raw material composition for a surface coating layer" of Example 1, a raw material composition for a surface coating layer was prepared. This raw material composition for a surface coating layer is defined as a raw material composition A for a surface coating layer.
(2-2) Preparation of Raw Material Composition B for a Surface Coating Layer
As a low melting point glass (amorphous inorganic material), 60 parts by weight of a $SiO_2$—$BaO$—$B_2O_3$ type glass powder (K807, manufactured by Asahi Glass Co., Ltd.) having a softening point of 720° C. was prepared, and 40 parts by weight of an aqueous methylcellulose solution (product name: METOLOSE-65SH, manufactured by Shin-Etsu Chemical Co., Ltd.) as a binder was added to the glass powder, and they were mixed to prepare a raw material composition for a surface coating layer.

This raw material composition for a surface coating layer is defined as a raw material composition B for a surface coating layer.
(3) Coating with the Raw Material Composition a for a Surface Coating Layer
About 0.2 g of the raw material composition A for a surface coating layer prepared in (2-1) was applied to the whole base material by spray coating (atomized spray painting).
(4) First Heating
The base material to which the raw material composition A for a surface coating layer had been applied was dried in a dryer under the conditions of the temperature in the furnace of 160° C. and 60 minutes. Subsequently, the base material was heated and fired in a heating furnace under the conditions of the temperature in the furnace of 850° C. for 20 minutes, to form a surface coating layer (surface coating layer 20a).
(5) Masking
A masking tape (item's stock number: 851T manufactured by 3M company) was applied to a site serving as the character portion on a surface of the base material.

(6) Coating with the Raw Material Composition B for a Surface Coating Layer

About 0.2 g of the raw material composition B for a surface coating layer prepared in (2-2) was applied to the whole surface of the base material including a site to which the masking material had been applied, by spray coating (atomized spray painting).

(7) Peeling the Masking Material

The masking material was peeled from the base material.

(8) Second Heating

The base material to which the raw material composition B for a surface coating layer had been applied was dried in a dryer under the conditions of the temperature in the furnace of 160° C. for 60 minutes. Subsequently, the base material was heated and fired in a heating furnace under the conditions of the temperature in the furnace of 850° C. and 20 minutes, to form a surface coating layer (surface coating layer 20b).

By the above-mentioned steps, a sample for property evaluation was made.

Then, in the same manner as in Example 1, evaluation of identifiability, and adherability of the surface coating layer was performed.

The blending ratio between an amorphous inorganic material and a crystalline inorganic material in the character portion of the sample is amorphous inorganic material: crystalline inorganic material=6:4. In addition, the thickness of the surface coating layer at the character portion is 5.6 µm.

On the other hand, the blending ratio between an amorphous inorganic material and a crystalline inorganic material in the background portion is amorphous inorganic material: crystalline inorganic material=6:4 at a portion of the surface coating layer 20a of the lower layer, and amorphous inorganic material:crystalline inorganic material=6:0 at a portion of the surface coating layer 20b of the upper layer.

In addition, the thickness of the surface coating layer at a background portion is 5.6 µm at a portion of the surface coating layer 20a of the lower layer, and 6.1 µm a portion of the surface coating layer 20b of the upper layer.

When evaluation of identifiability was performed concerning the sample for property evaluation of Example 7, the evaluation was "good" in both of in the initial state and after the heating test. In addition, evaluation of adherability of the surface coating layer of the sample for property evaluation of Example 7 was "good".

The characteristics and the evaluation results of the sample for property evaluation made in Example 7 are summarized in Table 4.

In Table 4, the blending ratio at the background portion was expressed as "6:4+6:0" in the sense of 6:4 of the lower layer and 6:0 of the upper layer. In addition, the thickness (layer thickness) of the surface coating layer was expressed as "5.6+6.1" in the sense of 5.6 µm of the lower layer and 6.1 µm of the upper layer.

That is, concerning the character portion, composition: surface coating layer, blending ratio: 6:4, layer thickness: 5.6 µm, and base material surface roughness: 10.3 µm. Concerning the background portion, composition: surface coating layer, blending ratio: 6:4+6:0, layer thickness: 5.6+6.1 µm, and base material surface roughness: 10.3 µm.

Identifiability in the initial state: good, identifiability after the heating test: good, and adherability: good.

Example 8

A masking tape was applied to a site serving as the background portion, in the masking in Example 7. In the same manner as in Example 7 as for other points, a sample for property evaluation was made.

Then, in the same manner as in Example 1, evaluation of identifiability, and adherability of the surface coating layer was performed.

The blending ratio between an amorphous inorganic material and a crystalline inorganic material in the character portion of the sample is amorphous inorganic material: crystalline inorganic material=6:4 at a portion of the surface coating layer 20a of the lower layer, and amorphous inorganic material:crystalline inorganic material=6:0 at a portion of the surface coating layer 20b of the upper layer.

In addition, the thickness of the surface coating layer at the character portion is 5.4 µm at a portion of the surface coating layer 20a of the lower layer, and 5.8 µm at a portion of the surface coating layer 20b of the upper layer.

On the other hand, the blending ratio between an amorphous inorganic material and a crystalline inorganic material in the background portion is amorphous inorganic material: crystalline inorganic material=6:4. In addition, the thickness of the surface coating layer at the background portion is 5.4 µm.

When evaluation of identifiability was performed concerning the sample for property evaluation of Example 8, the evaluation was "good" in both of in the initial state and after the heating test. In addition, evaluation of adherability of the surface coating layer of the sample for property evaluation of Example 8 was "good".

The characteristics and the evaluation results of the sample for property evaluation made in Example 8 are summarized in Table 4.

That is, concerning the character portion, composition: surface coating layer, blending ratio: 6:4+6:0, layer thickness: 5.4+5.8 µm, and base material surface roughness: 10.3 µm. Concerning the background portion, composition: surface coating layer, blending ratio: 6:4, layer thickness: 5.4 µm, and base material surface roughness: 10.3 µm.

Identifiability in the initial state: good, identifiability after the heating test: good, and adherability: good.

TABLE 4

| | Character portion | | | | Background portion | | | | Identifiability | | |
|---|---|---|---|---|---|---|---|---|---|---|---|
| | Composition | Blending ratio | Layer thickness (µm) | Base material surface roughness (Rzjis: µm) | Composition | Blending ratio | Layer thickness (µm) | Base material surface roughness (Rzjis: µm) | Initial state | After heating test | Adherability |
| Example 7 | Surface coating layer | 6:4 | 5.6 | 10.3 | Surface coating layer | 6:4 + 6:0 | 5.6 + 6.1 | 10.3 | Good | Good | Good |

TABLE 4-continued

| | Character portion | | | | Background portion | | | | Identifiability | | |
|---|---|---|---|---|---|---|---|---|---|---|---|
| | Composition | Blending ratio | Layer thickness (μm) | Base material surface roughness (Rzjis: μm) | Composition | Blending ratio | Layer thickness (μm) | Base material surface roughness (Rzjis: μm) | Initial state | After heating test | Adherability |
| Example 8 | Surface coating layer | 6:4 + 6:0 | 5.4 + 5.8 | 10.3 | Surface coating layer | 6:4 | 5.4 | 10.3 | Good | Good | Good |

Blending ratio: Blending ratio (weight ratio) between an amorphous inorganic material and a crystalline inorganic material in a paint for a surface coating layer, expressed by "amorphous inorganic material:crystalline inorganic material"

In the samples for property evaluation of Examples 7 and 8, since the thickness of the surface coating layer of a site serving as the character portion is different from the thickness of the surface coating layer of a site serving as the background portion, and the chemical composition is also different between them, identifiability was excellent in both of in the initial state and after the heating test.

In addition, adherability between the surface coating layer and the base material was also good, and no crack or dropping out existed on the surface coating layer after the heating test.

(Fifth Embodiment)

A fifth embodiment which is one embodiment of an exhaust pipe of the present invention, and a method for manufacturing the exhaust pipe will be explained below.

In the exhaust pipe in accordance with the fifth embodiment of the present invention, a site having a great surface roughness and a site having a small surface roughness are provided on the surface of the base material, the character portion is a surface coating layer formed on either the site having a great surface roughness or the site having a small surface roughness, and the background portion is a surface coating layer formed on a site having a different surface roughness from the surface roughness of the site on which the character portion is formed.

Figure 13:
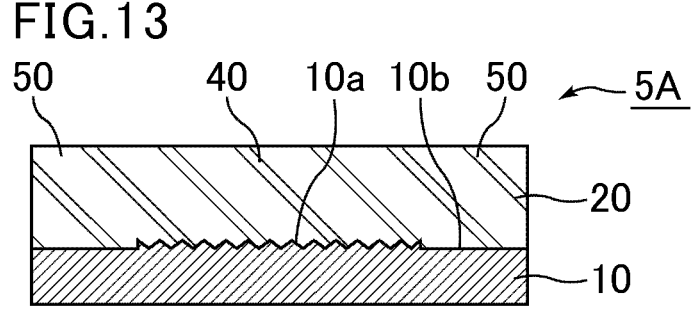
FIG. 13 is a cross-sectional view schematically showing one example of the exhaust pipe in accordance with a fifth embodiment of the present invention.
Figure 14:
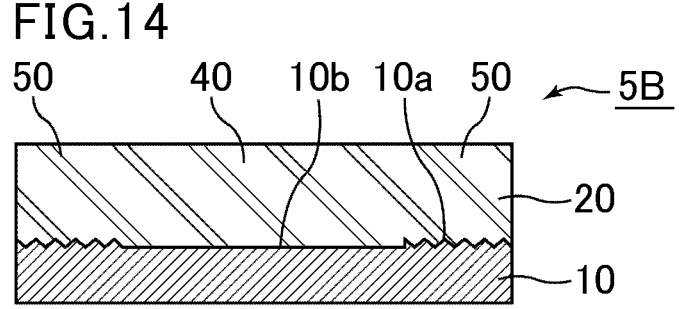
FIG. 14 is a cross-sectional view schematically showing another example of the exhaust pipe in accordance with the fifth embodiment of the present invention.

FIG. 13 is a cross-sectional view schematically showing one example of the exhaust pipe in accordance with the fifth embodiment of the present invention, and FIG. 14 is a cross-sectional view schematically showing another example of the exhaust pipe in accordance with the fifth embodiment of the present invention.

In an exhaust pipe 5A shown in FIG. 13, a site 10a having a great surface roughness and a site 10b having a small surface roughness are provided on a surface of a base material 10.

When the average of surface roughnesses of arbitrary five points in an arbitrary region of about 1 cm² on a base material, and the average of surface roughnesses of arbitrary five points in another arbitrary region of about 1 cm² are compared, if there are places in which the surface roughnesses are different by more than about 2 μm as expressed by $Rz_{JIS}$, this is defined that a "site having a great surface roughness" and a "site having a small surface roughness" are provided.

The surface roughness $Rz_{JIS}$ is measured according to JIS B 0601 (2001).

A character portion 40 is the surface coating layer 20 formed on the site 10a having a great surface roughness. A background portion 50 is the surface coating layer 20 formed on the site 10b having a small surface roughness.

An amorphous inorganic material constituting the surface coating layer 20 is usually a transparent material. For that reason, the appearance of the surface coating layer reflects a difference in the surface roughness of a surface of the base material.

As a result, since the surface roughness of a surface of the base material is different between the character portion 40 and the background portion 50, the appearance is different between them.

An exhaust pipe 5B shown in FIG. 14 is the same as the exhaust pipe 5A in that a site 10a having a great surface roughness and a site 10b having a small surface roughness are provided on a surface of a base material 10.

The character portion 40 is the surface coating layer 20 formed on the site 10b having a small surface roughness. The background portion 50 is the surface coating layer 20 formed on the site 10a having a great surface roughness.

Also in the constitution of the exhaust pipe 5B shown in FIG. 14, since the surface roughness of a surface of the base material is different between the character portion 40 and the background portion 50, the appearance is different between them.

Therefore, in the exhaust pipe 5A and the exhaust pipe 5B, the character portion and the background portion are visually recognized discriminably by a worker. For that reason, information can be displayed by the character portion and the background portion.

In the exhaust pipe in accordance with the fifth embodiment of the present invention, it is preferable that the difference in the surface roughness between the site having a great surface roughness and the site having a small surface roughness is about 2 μm or more as expressed by $Rz_{JIS}$.

When the difference in the surface roughness is about 2 μm or more as expressed by $Rz_{JIS}$, the appearance of the character portion and that of the background portion are clearly discriminated, and identifiability is improved.

In addition, it is preferable that the difference in the surface roughness between the site having a great surface roughness and the site having a small surface roughness is about 20 μm or less as expressed by $Rz_{JIS}$.

This is because there is no portion having a surface roughness of more than about 20 μm as expressed by $Rz_{JIS}$ when the difference in the surface roughness not more than about 20 μm as expressed by $Rz_{JIS}$, and adherability between this portion and the surface coating layer tends not to become weak.

In addition, it is desirable that the surface roughness of a surface of the base material at the site having a great surface roughness is from about 5 μm to about 14 μm as expressed by $Rz_{JIS}$, and that the surface roughness of a surface of the base material at the site having a small surface roughness is from about 0.1 μm to about 3.0 μm as expressed by $Rz_{JIS}$.

When the surface roughness of a surface of the base material at the site having a great surface roughness and the surface roughness of a surface of the base material at the site having a small surface roughness are in these ranges, the difference between the surface roughness of the site having a great surface roughness and the surface roughness of the site having a small surface roughness tends to be controlled in a certain range.

In the exhaust pipe in accordance with the fifth embodiment of the present invention, it is desirable that the thickness of the surface coating layer is about 7 μm or less. When the thickness of the surface coating layer is about 7 μm or less, it is preferable since the distance from a surface of the surface coating layer to a surface of the base material is small, and the appearance of the surface coating layer easily reflects the difference in the surface roughness of a surface of the base material.

In addition, it is desirable that the thickness of the surface coating layer is about 1 μm or more.

This is because thermal insulating performance due to provision of the surface coating layer is easily exerted when the thickness of the surface coating layer is about 1 μm or more.

Then, the method for manufacturing an exhaust pipe in accordance with the fifth embodiment of the present invention will be explained taking for example the case where the exhaust pipe 5A shown in FIG. 13 is made.

(1) Preparing and Cleaning a Base Material Made of a Metal

In the same manner as in the procedure explained in the first aspect (1) of the method for manufacturing an exhaust pipe of the first embodiment of the present invention, a base material made of a metal is prepared and cleaned.

(2) Masking

A masking material is applied to a site serving as a site having a small surface roughness (herein, a site serving as the background portion) on a surface of the base material. As the masking material, a masking tape, a resin for masking and the like can be used.

A material which endures roughening treatment described later is preferable.

(3) Roughening Treatment

An exposed site of a surface of the base material (herein, a site serving as the character portion) is subjected to roughening treatment to roughen the surface of the base material.

As a method of roughening treatment, for example, a roughening treatment method such as sandblast, etching, high temperature oxidation treatment, shotblast, polishing, elution, or cutting can be used.

These may be used alone, or two or more kinds may be used together.

After this roughening treatment, cleaning treatment may be further performed.

(4) Peeling the Masking Material

The masking material is peeled from the base material. When the masking material is peeled, the site to which the masking material has been applied serves as a site having a small surface roughness, and the site to which the masking material has not been applied serves as a site having a great surface roughness.

(5) From Forming a Coating Film to Heating

In the same manner as in the procedure of the first aspect of the method for manufacturing an exhaust pipe of the first embodiment of the present invention, "(3) Forming a first coating film" and "(6) Heating", a surface coating layer is formed on the whole surface of the base material.

The thus formed surface coating layer formed on the site having a great surface roughness of the base material serves as the character portion, the surface coating layer formed on the site having a small surface roughness of the base material serves as a background portion, and an information display in which the character portion and the background portion are located in the surface coating layer is formed.

In addition, as the coating film forming, electrocoating using an electrocoating paint, which was explained in the method for manufacturing an exhaust pipe of the third embodiment of the present invention, may be performed.

In addition, when a masking material is applied to a site serving as the character portion in place of the site serving as the background portion in (2) masking, the surface coating layer formed on the site having a great surface roughness of the base material serves as the background portion, and the surface coating layer formed on the site having a small surface roughness of the base material serves as the character portion.

By this procedure, the exhaust pipe 5A and the exhaust pipe 5B shown in FIG. 13 and FIG. 14, which are each one example of the exhaust pipe in accordance with the fifth embodiment of the present invention, can be manufactured.

The exhaust pipe in accordance with the fifth embodiment of the present invention, and the method for manufacturing an exhaust pipe can exert the effects (1), and (3) to (6) of the exhaust pipe in accordance with the first embodiment of the present invention, and the method for manufacturing an exhaust pipe.

In addition, the following effects can be exerted.

(13) In the exhaust pipe of the present embodiment, a site having a great surface roughness and a site having a small surface roughness are provided on a surface of a base material, the character portion is a surface coating layer formed on either the site having a great surface roughness and the site having a small surface roughness, and the background portion is a surface coating layer formed on a site having a different surface roughness from the surface roughness of the site on which the character portion is formed.

The appearance of the surface coating layer reflects a difference in the surface roughness of a surface of a base material. For that reason, the character portion and the background portion are visually recognized discriminably by a worker. As a result, information may become easier to be displayed by the character portion and the background portion.

(14) In the method for manufacturing an exhaust pipe of the present embodiment, the forming an information display includes a providing a site having a great surface roughness and a site having a small surface roughness on a surface of the base material.

According to such a method, the appearance of the surface coating layer tends to be made to be different between the character portion and the background portion.

For that reason, due to a difference in the appearance of the surface coating layer between the character portion and the background portion, information may become easier to be displayed.

Examples more specifically disclosing the fifth embodiment of the present invention will be shown below. However, the present invention is not limited to only these examples.

Example 9

(1) Preparing and Cleaning a Base Material Made of a Metal

As a base material made of a metal, a flat plate-like stainless base material (made of SUS430) of length 100 mm×width 100 mm×thickness 2.0 mm was prepared.

This base material was ultrasonic-cleaned in an alcohol solvent.

(2) Masking

A masking tape (item's stock number: 851T manufactured by 3M company) was applied to a site serving as the background portion on a surface of the base material.

(3) Roughening Treatment

Subsequently, sandblast treatment was performed to roughen both the surfaces of the base material. Sandblast treatment was performed for 10 minutes using a #100 $Al_2O_3$ abrasive grain.

(4) Peeling the Masking Material

The masking material was peeled from the base material.

The surface roughness of a surface of the base material at a site to which the masking material had been applied (site serving as the background portion), and a site to which the masking material had not been applied (site serving as the character portion) was measured using a surface roughness measuring device (Handy Surf E-35B manufactured by Tokyo Seimitsu Co., Ltd.).

The surface roughness of the site serving as the background portion was $Rz_{JIS}$=1.6 µm.

The surface roughness of the site serving as the character portion was $Rz_{JIS}$=10.3 µm.

(5) From Forming a Coating Film to Heating

In the same manner as in "(2) Preparing an electrocoating paint A" of Example 5, an electrocoating paint A having a solid content concentration of 15% was prepared.

Using this electrocoating paint A and in the same manner as in "(5) Forming a first coating film" of Example 5, the electrocoating paint A was applied to the whole surface of the base material.

Thereafter, the base material to which the electrocoating paint A had been applied was heated in a heating furnace at a temperature in the furnace of 400° C. for 60 minutes and, subsequently, heated and fired at a temperature in the furnace of 850° C. for 20 minutes, to form a surface coating layer.

By the above-mentioned steps, a sample for property evaluation was made.

Then, in the same manner as in Example 1, evaluation of identifiability, and adherability of the surface coating layer was performed.

The thickness of the surface coating layer at the character portion of the sample for property evaluation of Example 9 was 4.7 µm, and the thickness of the surface coating layer at the background portion was 4.5 µm.

When evaluation of identifiability was performed concerning the sample for property evaluation of Example 9, the evaluation was "good" in both of in the initial state and after the heating test. In addition, evaluation of adherability of the surface coating layer of the sample for property evaluation of Example 9 was "good".

The characteristics and the evaluation results of the sample for property evaluation made in Example 9 are summarized in Table 5.

That is, concerning the character portion, composition: surface coating layer, blending ratio: 6:4, layer thickness: 4.7 µm, and base material surface roughness: 10.3 µm. Concerning the background portion, composition: surface coating layer, blending ratio: 6:4, layer thickness: 4.5 µm, and base material surface roughness: 1.6 µm.

Identifiability in the initial state: good, identifiability after the heating test: good, and adherability: good.

Example 10

In the masking step in Example 9, a masking tape was applied to a site serving as the character portion. In the same manner as in Example 9 as for other points, a sample for property evaluation was made.

Then, in the same manner as in Example 1, evaluation of identifiability, and adherability of the surface coating layer was performed.

In the sample for property evaluation of Example 10, the surface roughness of a surface of the base material at the site serving as the background portion was $Rz_{JIS}$=10.3 µm.

The surface roughness of a surface of the base material at the site serving as the character portion was $Rz_{JIS}$=1.6 µm.

The thickness of the surface coating layer at the character portion of the sample for property evaluation of Example 10 was 4.9 µm, and the thickness of the surface coating layer at the background portion was 4.9 µm.

When evaluation of identifiability was performed concerning the sample for property evaluation of Example 10, the evaluation was "good" in both of in the initial state and after the heating test. In addition, evaluation of adherability of the surface coating layer of the sample for property evaluation of Example 10 was "good".

The characteristics and the evaluation results of the sample for property evaluation made in Example 10 are summarized in Table 5.

That is, concerning the character portion, composition: surface coating layer, blending ratio: 6:4, layer thickness: 4.9 µm, and base material surface roughness: 1.6 µm. Concerning the background portion, composition: surface coating layer, blending ratio: 6:4, layer thickness: 4.9 µm, and base material surface roughness: 10.3 µm.

Identifiability in the initial state: good, identifiability after the heating test: good, and adherability: good.

Reference Example 4

In sandblast treatment in "(3) Roughening treatment" of Example 9, the grade of the abrasive grain was changed to #220. In the same manner as in the procedure of Example 9 as for other points, a sample for evaluation was made.

Then, in the same manner as in Example 1, evaluation of identifiability, and adherability of the surface coating layer was performed.

The surface roughness of a surface of the base material at the site serving as the background portion was $Rz_{JIS}$=1.6 µm.

The surface roughness of a surface of the base material at the site serving as the character portion was $Rz_{JIS}$=3.0 µm.

The thickness of the surface coating layer at the character portion of the sample for property evaluation of Reference Example 4 was 5.3 µm, and the thickness of the surface coating layer at the background portion was 5.7 µm.

When evaluation of identifiability was performed concerning the sample for property evaluation of Reference Example 4, the evaluation was "fair" in both of in the initial state and after the heating test. In addition, evaluation of adherability of the surface coating layer of the sample for property evaluation of Reference Example 4 was "good".

The characteristics and the evaluation results of the sample for property evaluation made in Reference Example 4 are summarized in Table 5.

That is, concerning the character portion, composition: surface coating layer, blending ratio: 6:4, layer thickness: 5.3 µm, and base material surface roughness: 3.0 µm. Concerning the background portion, composition: surface coating layer, blending ratio: 6:4, layer thickness: 5.7 µm, and base material surface roughness: 1.6 µm.

Identifiability in the initial state: fair, identifiability after the heating test: fair, and adherability: good.

Reference Example 5

In the electrocoating in "(5) Coating film forming" of Example 9, the electric conduction time was changed to 10 minutes to form a coating film having a greater thickness than that of Example 9. In the same manner as in the procedure of Example 9 as for other points, a sample for property evaluation was made.

Then, in the same manner as in Example 1, evaluation of identifiability, and adherability of the surface coating layer was performed.

The surface roughness of a surface of the base material at the site serving as the background portion was $Rz_{JIS}=1.6$ µm.

The surface roughness of a surface of the base material at the site serving as the character portion was $Rz_{JIS}=10.3$ µm.

The thickness of the surface coating layer at the character portion of the sample was 8.2 µm, and the thickness of the surface coating layer at the background portion of the sample was 8.0 µm.

When evaluation of identifiability was performed concerning the sample for property evaluation of Reference Example 5, the evaluation was "fair" in both of in the initial state and after the heating test. In addition, evaluation of adherability of the surface coating layer for property evaluation of Reference Example 5 was "good".

The characteristics and the evaluation results of the sample for property evaluation made in Reference Example 5 are summarized in Table 5.

That is, concerning the character portion, composition: surface coating layer, blending ratio: 6:4, layer thickness: 8.2 µm, and base material surface roughness: 10.3 µm. Concerning the background portion, composition: surface coating layer, blending ratio: 6:4, layer thickness: 8.0 µm, and base material surface roughness: 1.6 µm.

Identifiability in the initial state: fair, identifiability after the heating test: fair, and adherability: good.

thickness of the surface coating layer is 4.9 µm at the character portion and the background portion, and it is thought that identifiability was excellent in both of in the initial state and after the heating test since the thickness of the surface coating layer is not too great at both the portions.

In addition, in the samples for property evaluation of Examples 9 and 10, adherability between the surface coating layer and the base material was also good, and no crack or dropping out existed on the surface coating layer after the heating test.

(Other Embodiments)

In the exhaust pipe according to embodiments of the present invention, it is preferable that the size of the information display is from about 1% to about 30% of the surface area of the exhaust pipe.

When the size of the information display is about 1% or more of the surface area of the exhaust pipe, the size of the information display is sufficiently great and a worker may become easier to recognize the information display visually.

In addition, a size of the information display of about 30% or less of the surface area of the exhaust pipe is preferable since existence of the information display slightly influences on thermal insulating performance of the exhaust pipe.

The size of the information display can be defined as the area of a plane (width W, height H) of such a shape that the whole character portion is located, as shown with a dotted line in FIG. 1, drawn on a surface of the exhaust pipe.

It is desirable that the width W is from about 0.5 mm to about 4500 mm, and that the height H is from about 3.0 mm to about 350 mm.

TABLE 5

| | Character portion | | | | Background portion | | | | Identifiability | | |
|---|---|---|---|---|---|---|---|---|---|---|---|
| | Composition | Blending ratio | Layer thickness (µm) | Base material surface roughness (Rzjis: µm) | Composition | Blending ratio | Layer thickness (µm) | Base material surface roughness (Rzjis: µm) | Initial state | After heating test | Adherability |
| Example 9 | Surface coating layer | 6:4 | 4.7 | 10.3 | Surface coating layer | 6:4 | 4.5 | 1.6 | Good | Good | Good |
| Example 10 | Surface coating layer | 6:4 | 4.9 | 1.6 | Surface coating layer | 6:4 | 4.9 | 10.3 | Good | Good | Good |
| Reference Example 4 | Surface coating layer | 6:4 | 5.3 | 3.0 | Surface coating layer | 6:4 | 5.7 | 1.6 | Fair | Fair | Good |
| Reference Example 5 | Surface coating layer | 6:4 | 8.2 | 10.3 | Surface coating layer | 6:4 | 8.0 | 1.6 | Fair | Fair | Good |

Blending ratio: Blending ratio (weight ratio) between an amorphous inorganic material and a crystalline inorganic material in a paint for a surface coating layer, expressed by "amorphous inorganic material:crystalline inorganic material"

In the samples for property evaluation of Examples 9 and 10, a site having a great surface roughness (10.3 µm at the character portion or the background portion, respectively) and a site having a small surface roughness (1.6 µm at the background portion or the character portion, respectively) are provided on a surface of a base material and, further, due to a great difference in the surface roughness thereof (8.7 µm, respectively), identifiability was excellent in both of in the initial state and after the heating test.

In addition, in the sample for property evaluation of Example 9, the thickness of the surface coating layer is 4.7 µm at the character portion and 4.5 µm at the background portion and, in the sample for property evaluation of Example 10, the The line width of a character constituting the character portion is desirably from about 0.5 mm to about 50 mm, more desirably from about 0.6 mm to about 30 mm, further desirably from about 0.7 mm to about 10 mm.

When the line width of a character is about 0.5 mm or more, a worker may become easier to recognize the information display visually. In addition, a character portion may become easier to be formed in making the exhaust pipe.

When the line width of a character is about 50 mm or less, the information display which is easier to be visually recognized by a worker tends to be made without making the size of a character too great.

In the exhaust pipe according to the embodiments of the present invention, the shape of the base material may be a flat plate, a hemicylinder, a cylinder and the like, and the shape of an outer edge of a cross-section thereof may be an arbitrary shape such as an elliptical shape or a polygonal shape.

When the base material of the exhaust pipe is a cylindrical body, the diameter of the base material does not have to be constant along a longitudinal direction, and the cross-sectional shape perpendicular to the length direction does not have to be constant along the longitudinal direction.

In the exhaust pipe according to the embodiments of the present invention, a desirable lower limit of the thickness of the base material is about 0.2 mm, a more desirable lower limit is about 0.4 mm, a desirable upper limit is about 10 mm, and a more desirable upper limit is about 4 mm.

When the thickness of the base material of the exhaust pipe is not less than about 0.2 mm, the strength of the exhaust pipe is less likely to be deficient. When the thickness of the base material of the exhaust pipe is less than about 10 mm, the weight of the exhaust pipe tends not to become great, and for example, it may become easier to mount the pipe on a vehicle such as an automobile and the pipe is more likely to be put to practical use.

As a masking material used in the masking upon manufacture of the exhaust pipe according to the embodiments of the present invention, when coating with a raw material composition for a surface coating layer is performed by spray coating, an iron plate, a paper piece or the like from which the shape of the character portion or the background portion has been cut out may be used.

In the method for manufacturing the exhaust pipe according to the embodiments of the present invention, as suppressing formation of a coating film onto a base material, in place of the masking the base material, forming a material repelling a paint on the base material may be performed.

When the material repelling a paint is formed on the base material, since a paint is not applied to the material repelling a paint, a place on which a coating film is formed can be determined as well as in the case where the base material is masked.

Examples of the material repelling a paint include an oil.

Upon manufacture of the exhaust pipe according to the embodiments of the present invention, in order to remove part of the coating film or part of the surface coating layer, or in order to provide a site having a great surface roughness on a surface of the base material, sandblast may be used. When sandblast is used, the amount of removal of the coating film or the surface coating layer, or the surface roughness of the base material may become easier to be adjusted in a predetermined range by changing the condition of sandblast.

Examples of the changeable condition of sandblast include the particle diameter (grade) of an abrasive grain, the time for injecting the abrasive grain, and the pressure for injecting the abrasive grain.

In addition, in each step explained using shotblast in explanation of the method for manufacturing the exhaust pipe according to the embodiments of the present invention, sandblast may be used.

When the raw material composition for a surface coating layer used upon manufacture of the exhaust pipe according to the embodiments of the present invention contains a crystalline inorganic material and an amorphous inorganic material, the blending amount of the amorphous inorganic material is such that a desirable lower limit is about 50% by weight and a desirable upper limit is about 99.5% by weight based on the total weight of a powder of the amorphous inorganic material and a powder of the crystalline inorganic material.

When the blending amount of the amorphous inorganic material contained in the surface coating layer of the exhaust pipe is not less than about 50% by weight, the surface coating layer tends not to be dropped out in the manufactured exhaust pipe since the amount of the amorphous inorganic material contributing to adhesion between the surface coating layer and the base material of the exhaust pipe is not too small. On the other hand, when the blending amount of the amorphous inorganic material contained in the surface coating layer of the exhaust pipe is not more than about 99.5% by weight, the amount of the crystalline inorganic material is not too small and the sufficient effect of improving adherability between the surface coating layer and the base material of the exhaust pipe tends to be obtained. The blending amount of the amorphous inorganic material contained in the raw material composition for a surface coating layer is such that a more desirable lower limit is about 60% by weight, and a more desirable upper limit is about 95% by weight.

When the raw material composition for a surface coating layer used upon manufacture of the exhaust pipe according to the embodiments of the present invention contains a crystalline inorganic material and an amorphous inorganic material, the blending amount of the crystalline inorganic material is such that a desirable lower limit is about 0.5% by weight and a desirable upper limit is about 50% by weight based on the total weight of a powder of the amorphous inorganic material and a powder of the crystalline inorganic material.

When the blending amount of the crystalline inorganic material contained in the surface coating layer of the exhaust pipe is not less than about 0.5% by weight, since the amount of the crystalline inorganic material contributing to adhesion between the surface coating layer and the base material of the exhaust pipe is not too small, the sufficient effect of improving adherability between the surface coating layer and the base material of the exhaust pipe tends to be obtained. On the other hand, when the blending amount of the crystalline inorganic material contained in the surface coating layer of the exhaust pipe is not more than about 50% by weight, the amount of the amorphous inorganic material contributing to adhesion between the surface coating layer and the base material of the exhaust pipe is not too small, and the surface coating layer tends not to be dropped out in the manufactured exhaust pipe.

Of the materials constituting the surface coating layer of the exhaust pipe, a crystalline inorganic material made of an oxide of a transition metal desirably has a low thermal expansion coefficient of from about $8\times10^{-6}/°$ C. to about $9\times10^{-6}/°$ C., and an amorphous inorganic material made of a low melting point glass desirably has a high thermal expansion coefficient of from about $8\times10^{-6}/°$ C. to about $25\times10^{-6}/°$ C. For that reason, by adjusting the blending ratio between the crystalline inorganic material and the amorphous inorganic material, the thermal expansion coefficient of the surface coating layer of the exhaust pipe tends to be controlled. On the other hand, of the materials constituting the base material, stainless steel has a thermal expansion coefficient of from about $10\times10^{-6}/°$ C. to about $18\times10^{-6}/°$ C. Therefore, by adjusting the blending ratio between the crystalline inorganic material and the amorphous inorganic material, thermal expansion coefficients of the surface coating layer and the base material of the exhaust pipe tends to be made to be closer. As a result, an adhesive force between the surface coating layer and the base material of the exhaust pipe tends to be improved.

It is desirable that the difference between the thermal expansion coefficient of the surface coating layer of the exhaust pipe and the thermal expansion coefficient of the base material is about $10\times10^{-6}/°$ C. or less. When the difference in the thermal expansion coefficient between both of them is about 10×10$^{-6}$/° C. or less, even when the surface coating layer of the exhaust pipe is exposed to a high temperature, peeling between both of them, or deformation or damage of the surface coating layer and the base material of the exhaust pipe hardly occurs since adherability between both of them is strong.

Examples of a dispersing medium which can be blended into the raw material composition for a surface coating layer used upon manufacture of the exhaust pipe according to the embodiments of the present invention include water, organic solvents such as methanol, ethanol and acetone, and the like. The blending ratio between the mixed powder or a powder of an amorphous inorganic material and the dispersing medium contained in the raw material composition for a surface coating layer is not particularly limited, but is desirably from about 50 parts by weight to about 150 parts by weight of the dispersing medium based on about 100 parts by weight of the mixed powder or the powder of the amorphous inorganic material. This is because a viscosity suitable for application to the base material can be obtained.

Examples of an organic binder which can be blended in the raw material composition for a surface coating layer include polyvinyl alcohol, methylcellulose, ethylcellulose, carboxymethylcellulose and the like. These may be used alone, or two or more kinds may be used together.

In addition, the dispersing medium and the organic binder may be used together.

In the exhaust pipe according to the embodiments of the present invention, it is an essential constituent feature that the exhaust pipe has a base material made of a metal, a surface coating layer containing an amorphous inorganic material on a surface of the base material, and an information display including a character portion and a background portion, and that at least one of the character portion and the background portion is located in the surface coating layer.

By appropriately combining such an essential constituent feature with a variety of constitutions detailed in the first embodiment to the fifth embodiment of the present invention, and other embodiments of the present invention (e.g. a relationship between thicknesses of the surface coating layer at the character portion and the background portion, the chemical composition of the surface coating layer and the like), a desired effect tends to be obtained.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An exhaust pipe comprising:
    a base material made of a metal;
    a surface coating layer provided on a surface of said base material, the surface coating layer comprising an amorphous inorganic material; and
    an information display comprising a character portion and a background portion, at least one of said character portion and said background portion being located in said surface coating layer,
    wherein said surface coating layer includes a first of the surface coating layer in which the character portion is located and a second part of the surface coating layer in which the background portion is located, and
    wherein a thickness of the first part of the surface coating layer is greater than a thickness of the second ma of the surface coating layer.

2. The exhaust pipe according to claim 1, wherein a thickness of said base material is from about 0.2 mm to about 10 mm.

3. The exhaust pipe according to claim 1, wherein (Ta—Tb) is from about 1 μm to about 20 μm, wherein a greater thickness and a smaller thickness are defined as Ta and Tb, respectively, among the thickness of the first part of the surface coating layer and the thickness of the second part of the surface coating layer.

4. The exhaust pipe according to claim 1, wherein among the thickness of the first part of the surface coating layer and the thickness of the second part of the surface coating layer, a greater thickness is from about 8 μm to about 30 μm.

5. The exhaust pipe according to claim 1, wherein among the thickness of the first part of the surface coating layer and the thickness of the second part of the surface coating layer, a smaller thickness is from about 1 μm to about 10 μm.

6. An exhaust pipe comprising:
    a base material made of a metal:
    a surface coating layer provided on a surface of said base material, the surface coating layer comprising an amorphous inorganic material and
    an information display comprising a character portion and a background portion, at least one of said character portion and said background portion being located in said surface coating layer,
    wherein one of said character portion and said background portion is an exposed area of the base material.

7. The exhaust pipe according to claim 6, wherein said character portion is the exposed area of the base material.

8. An exhaust pipe comprising:
    a base material made of a metal;
    a surface coating layer provided on a surface of said base material, the surface coating layer comprising an amorphous inorganic material; and
    an information display comprising a character portion and a background portion, at least one of said character portion and said background portion being located in said surface coating laver,
    wherein said surface coating layer includes a first. part of the surface coating layer in which the character portion is located and a second part of the surface coating layer in which the background portion is located, and at least one of the first part of the surface coating layer and the second part of the surface coating layer includes a crystalline inorganic material,
    wherein a chemical composition of the first part of the surface coating layer is different from a chemical composition of the second part of the surface coating layer, and
    wherein one of the first part of the surface coating layer and the second surface coating layer has a composition comprising the amorphous inorganic material and the crystalline inorganic, material, and another of the first part of the surface coating layer and the second surface coating layer has a composition consisting of the amorphous inorganic material, or
    the amorphous inorganic, material, the crystalline inorganic material, both of the amorphous inorganic material and the crystalline inorganic material, or an amount of the crystalline inorganic material relative to an amount of the amorphous inorganic material in said surface coating layer is different between the first part of the surface coating layer and the second part of the surface coating layer.

9. The exhaust pipe according to claim 1,
wherein at least one of the first part of the surface coating layer and the second part of the surface coating layer includes a crystalline inorganic material, and at least one of the first part of the surface coating layer and the second part of the surface coating includes a plurality of layers laminated in a thickness direction, at least two layers of the plurality of layers each having different chemical compositions and wherein in said plurality of layers having different chemical compositions, one layer includes the amorphous inorganic material and the crystalline inorganic material, and another layer consists of the amorphous inorganic material, or the amorphous inorganic material, the crystalline inorganic material, both of the amorphous inorganic material and the crystalline inorganic material, or an amount of the crystalline inorganic material relative to an amount of the amorphous inorganic material is different between in one layer of said plurality of layers and in another layer of said plurality of layers.

10. The exhaust pipe according to claim 1, wherein
the surface of said base material includes a first site having a first surface roughness and a second site having a second surface roughness, the first surface roughness being greater than the second surface roughness,
said character portion is the surface coating layer formed on one site of said first site and said second site, and
said background portion is the surface coating layer formed on another site of said first site and said second site which is different from the one site on which said character portion is formed.

11. The exhaust pipe according to claim 10, wherein the first surface roughness is from about 5 μm to about 14 μm as expressed by $Rz_{JIS}$.

12. The exhaust pipe according to claim 10, wherein the second surface roughness is from about 0.1 μm to about 3.0 μm as expressed by $Rz_{JIS}$.

13. The exhaust pipe according to claim 10, wherein a difference between the first surface roughness and the second surface roughness is from about 2 μm to about 20 μm as expressed by $Rz_{JIS}$.

14. The exhaust pipe according to claim 1, wherein said information display shows information about a product name, a product number, a manufacturing number, a product kind, a weight, a product size, an applicable type of vehicle, attention-seeking, contact information, a company name, or a combination thereof.

15. The exhaust pipe according to claim 1, wherein
said character portion is provided with a character showing information, and
said character is an alphabet, a digit, a Chinese character, a hiragana character, a katakana character, a symbol, a dot, or a combination thereof.

16. The exhaust pipe according to claim 1, wherein
a line width of a character constituting the character portion is from about 0.5 mm to about 50 mm.

17. The exhaust pipe according to claim 1, wherein a size of the information display including the character portion and the background portion is from about 1% to about 30% of a surface area of the exhaust pipe.

18. The exhaust pipe according to claim 1, wherein when a plane covering the entire character portion is drawn on a surface of the exhaust pipe, a height of the plane is from about 3.0 mm to about 350 mm.

19. The exhaust pipe according to claim 1, wherein when a plane covering the entire character portion is drawn on a surface of the exhaust pipe, a width of the plane is from about 0.5 mm to about 4500 mm.

20. The exhaust pipe according to claim 1, wherein said amorphous inorganic material is a low melting point glass having a softening point of from about 300° C. to about 1000° C., and is a $SiO_2$—$B_2O_3$—ZnO based glass, a $SiO_2$—$B_2O_3$—$Bi_2O_3$ based glass, a $SiO_2$—PbO based glass, a $SiO_2$—PbO—$B_2O_3$ based glass, a $SiO_2$—$B_2O_3$—PbO based glass, a $B_2O_3$—ZnO—PbO based glass, a $B_2O_3$—ZnO—$Bi_2O_3$ based glass, a $B_2O_3$—$Bi_2O_3$ based glass, a $B_2O_3$—ZnO based glass, a BaO—$SiO_2$ based glass, a $SiO_2$—BaO—$B_2O_3$ based glass, or a combination thereof.

21. The exhaust pipe according to claim 20, wherein said amorphous inorganic material has a thermal expansion coefficient of from about $8\times10^{-6}$/° C. to about $25\times10^{-6}$/° C.

22. The exhaust pipe according to claim 1, wherein said surface coating layer further comprises a crystalline inorganic material.

23. The exhaust pipe according to claim 22, wherein said crystalline inorganic material comprises inorganic particles made of an oxide of manganese, an oxide of iron, an oxide of copper, an oxide of cobalt, an oxide of chromium, an oxide of aluminum, or a combination thereof.

24. The exhaust pipe according to claim 22, wherein said crystalline inorganic material has a thermal expansion coefficient of from about $8\times10^{-6}$/° C. to about $9\times10^{-6}$/° C.

25. The exhaust pipe according to claim 1, wherein a difference in the thermal expansion coefficient between the surface coating layer and the base material is not more than about $10\times10^{-6}$/° C.

* * * * *

UNITED STATES PATENT AND TRADEMARK OFFICE
CERTIFICATE OF CORRECTION

| | | |
|---|---|---|
| PATENT NO. | : 9,074,705 B2 | Page 1 of 1 |
| APPLICATION NO. | : 13/431929 | |
| DATED | : July 7, 2015 | |
| INVENTOR(S) | : Kenzo Saiki | |

It is certified that error appears in the above-identified patent and that said Letters Patent is hereby corrected as shown below:

IN THE CLAIMS

Column 51, line 61, "a first of" should be changed to --a first part of--; line 66, "ma" should be changed to --part--.

Column 52, line 28, the "." after "background" should be deleted; line 42, the "." between "first" and "part" should be deleted.

Signed and Sealed this
Seventeenth Day of November, 2015

Michelle K. Lee
*Director of the United States Patent and Trademark Office*